United States Patent [19]
Onimaru et al.

[11] Patent Number: 6,007,443
[45] Date of Patent: Dec. 28, 1999

[54] HYBRID VEHICLE

[75] Inventors: Sadahisa Onimaru; Hironori Asa; Mitsuo Inagaki, all of Nishio, Japan

[73] Assignee: Nippon Soken, Inc., Nishio, Japan

[21] Appl. No.: 08/800,667

[22] Filed: Feb. 14, 1997

[30]     Foreign Application Priority Data

| Feb. 16, 1996 | [JP] | Japan | ................................ | 8-029162 |
| Feb. 20, 1996 | [JP] | Japan | ................................ | 8-032413 |
| Mar. 5, 1996 | [JP] | Japan | ................................ | 8-047355 |
| Jan. 16, 1997 | [JP] | Japan | ................................ | 9-005475 |

[51] Int. Cl.$^6$ .................................................. B60L 11/12
[52] U.S. Cl. .............................. 475/5; 180/65.2; 475/193
[58] Field of Search ........................... 477/3, 5; 180/65.2; 475/193

[56]     References Cited

U.S. PATENT DOCUMENTS

| 4,751,854 | 6/1988 | Sakai et al. | ............................. | 475/193 |
| 5,193,634 | 3/1993 | Masut | .................................... | 180/65.2 |
| 5,301,764 | 4/1994 | Gardner | .................................. | 180/65.2 |
| 5,484,346 | 1/1996 | Tokumoto et al. | ..................... | 475/193 |
| 5,755,303 | 5/1998 | Yamamoto et al. | .................. | 180/65.2 |
| 5,789,823 | 8/1998 | Sherman | ................................ | 180/65.2 |

FOREIGN PATENT DOCUMENTS

| 48-030223 | 3/1975 | Japan . |
| 5-008639 | 1/1993 | Japan . |
| 6-233411 | 8/1994 | Japan . |
| 7-015805 | 1/1995 | Japan . |

*Primary Examiner*—Dirk Wright
*Attorney, Agent, or Firm*—Pillsbury Madison & Sutro LLP

[57]     ABSTRACT

A hybrid vehicle in which, by using a continuously variable transmission inserted between output shafts of a heat engine such as an internal combustion engine and an electric motor as a torque distributor, the torque acting upon the driving wheels is distributed to the two and the distribution ratio between the engine and motor is changed, and control is performed so that the speed and/or torque of the heat engine becomes a predetermined constant value and the exhaust emission and fuel consumption are enhanced.

24 Claims, 18 Drawing Sheets

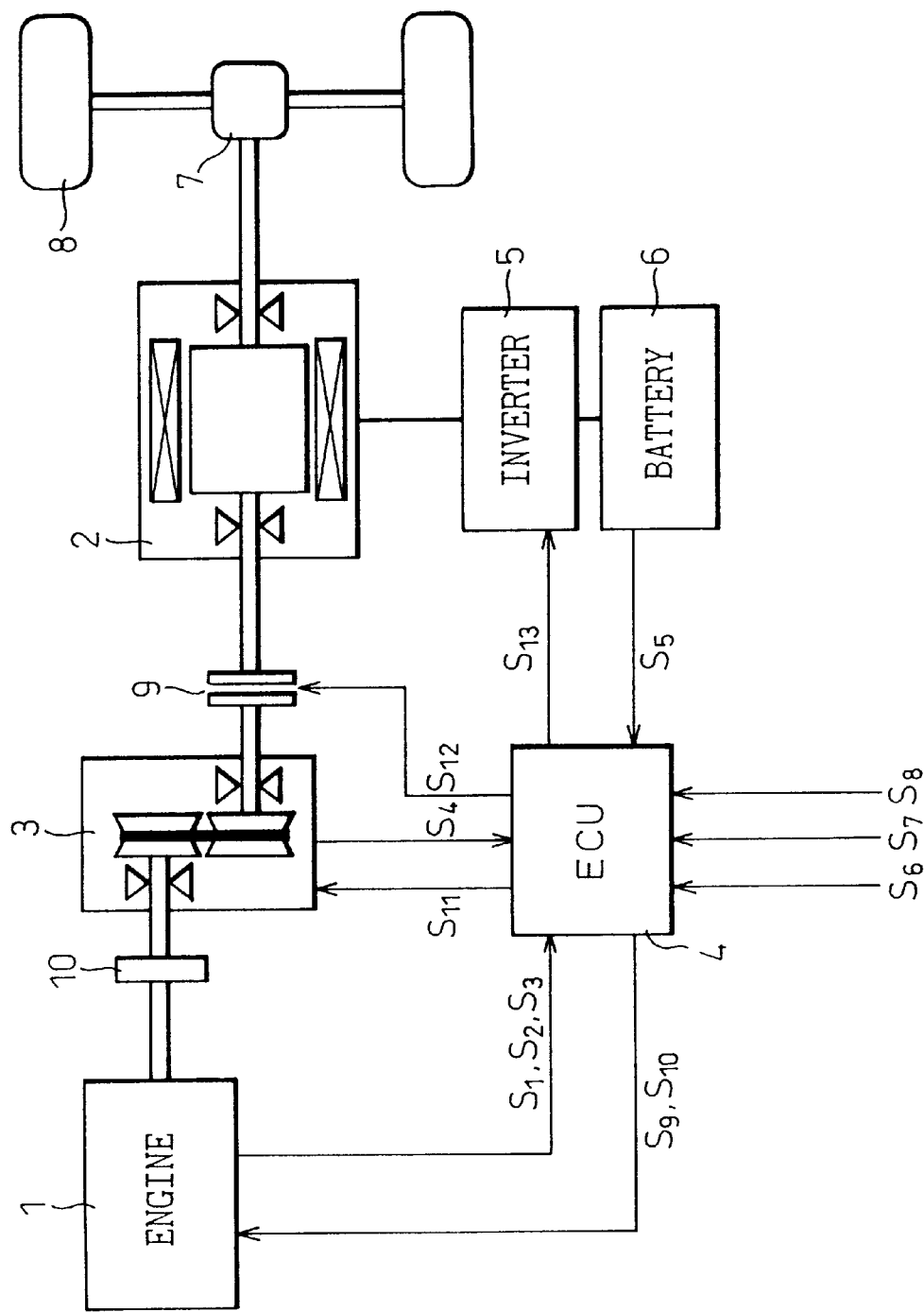

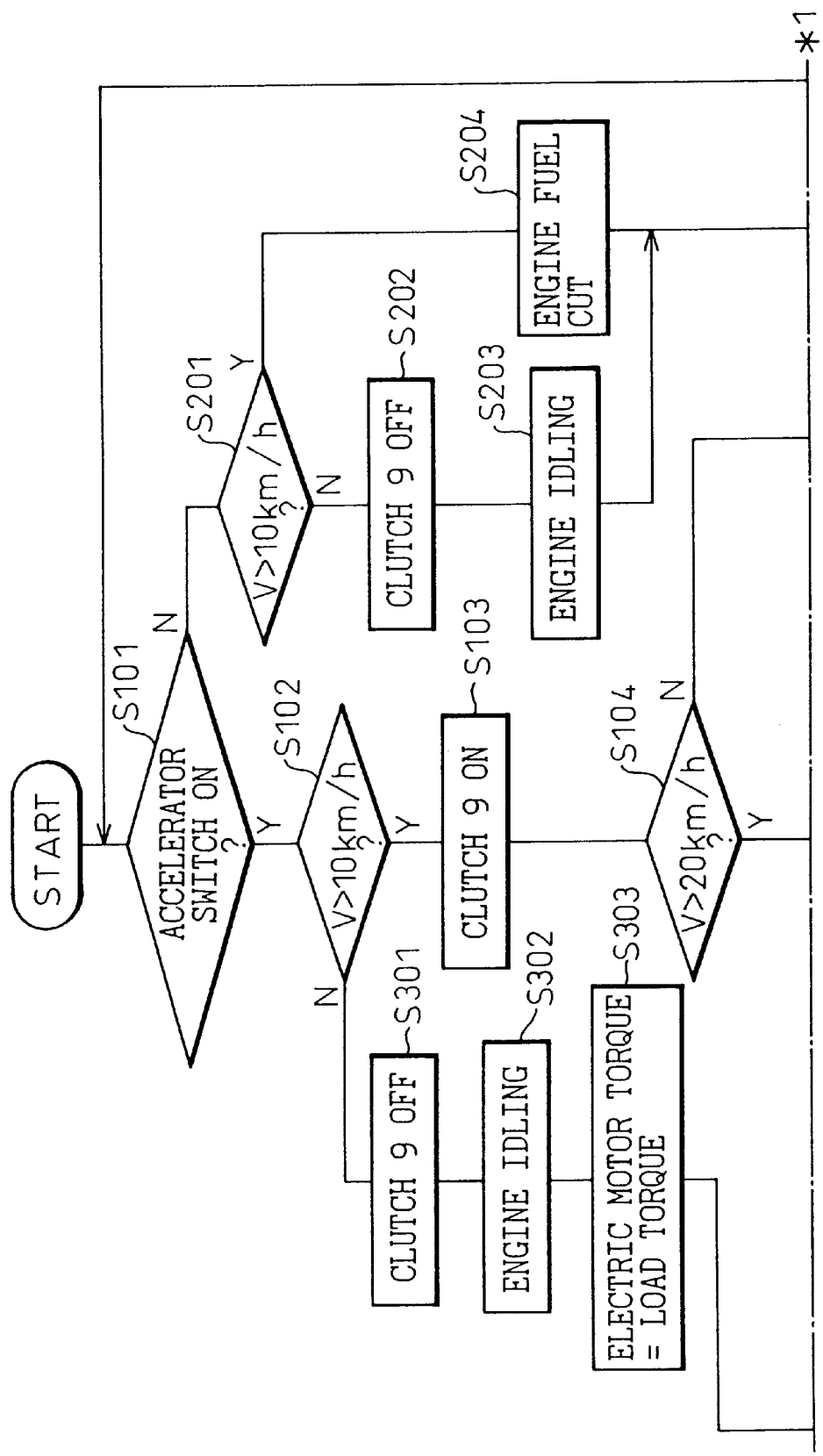

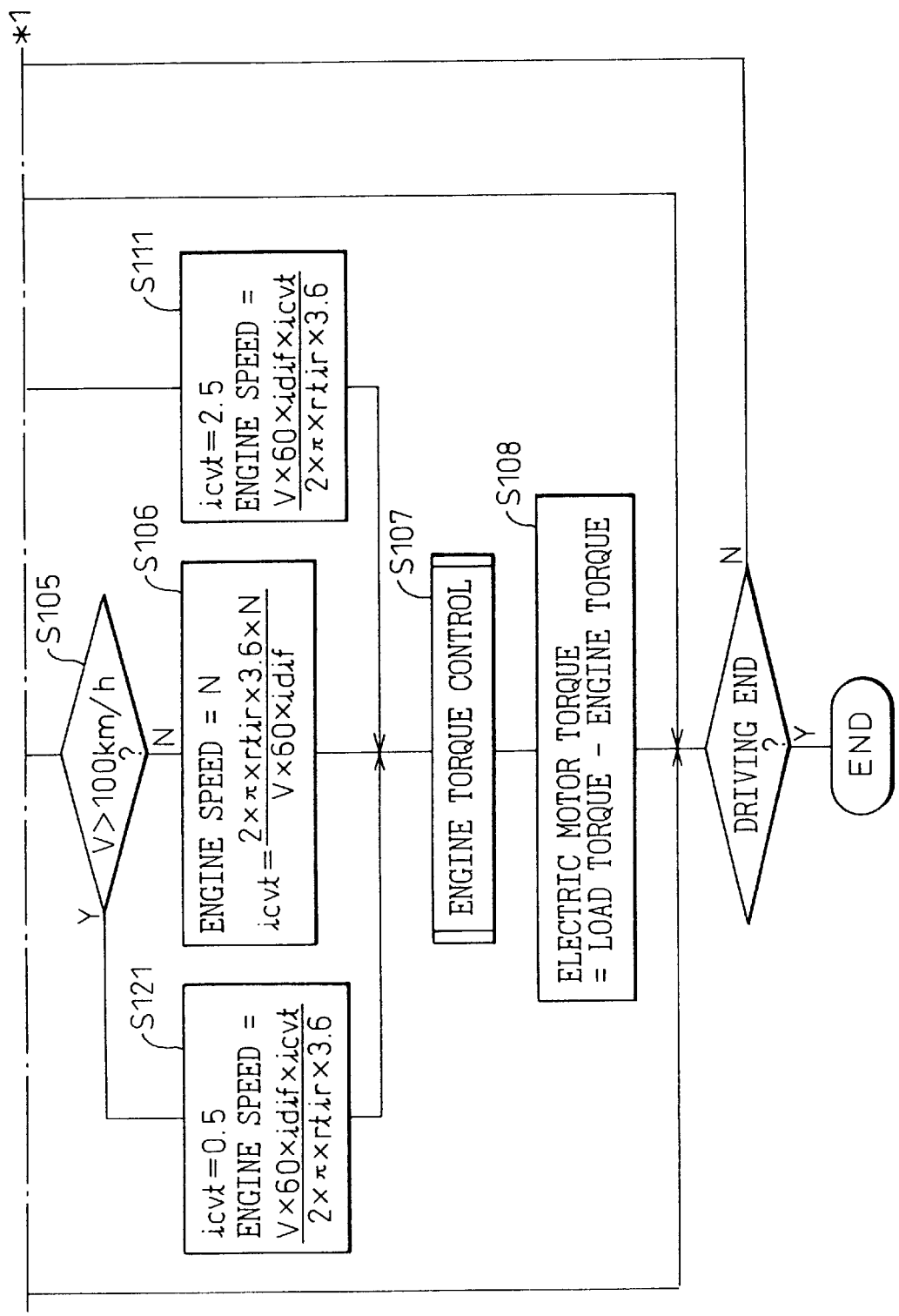

HYBRID VEHICLE

BACKGROUND OF THE INVENTION

1. Field of the Invention

The present invention relates to a vehicle using a heat engine such as an internal combustion engine and an electric motor in combination as a power source, i.e., a so-called hybrid vehicle.

2. Description of the Related Art

Hybrid vehicles using both an internal combustion engine and an electric motor may be roughly classified into two types. One type is referred to as the "SHV system" in which the internal combustion engine is connected to a power generator and performs only generation of electric power and charging of the battery and the electric motor receives the supply of the electric power from the power generator and the battery to drive the wheels (which can serve also as the power generator for the brakes). The other type is referred to as the "PHV system" in which both of the internal combustion engine and the electric motor (which can serve also as the power generator for the brakes) are mechanically connected to the wheels and can drive the wheels in parallel. The SHV system has a problem that the fuel consumption is degraded due to the conversion loss when converting all of the power of the internal combustion engine to electric power and then converting the same to power again. The PHV system has a problem that the exhaust emission deteriorates since the speed and output torque of the engine fluctuates while the vehicle is being driven.

As a countermeasure with respect to these problems, as disclosed in for example Japanese Unexamined Patent Publication No. 7-15805, there has been proposed a system in which the internal combustion engine and the electric motor are connected with the drive shaft by a sun-and-planet gear mechanism or a differential gear mechanism, the wheels are driven by the internal combustion engine so as to reduce the conversion loss, and, at the same time, the electric motor is controlled so that the speed of the internal combustion engine becomes constant, and thereby the deterioration of the exhaust emissions is prevented. However, the sun-and-planet gear mechanism and the differential gear mechanism function to divide the torque to be transmitted by a constant ratio, therefore if the driving torque of the wheels fluctuates in accordance with the state of driving, the required torque which should be generated by the internal combustion engine also changes. Thus, this is not sufficient as a means for preventing the deterioration of the exhaust emissions.

Further, as another system, as disclosed in Japanese Unexamined Patent Publication No. 6-233411, there exists a system which deals with the problem that when an internal combustion engine is connected to the wheels and operated under the conditions of a constant torque, the constant torque the engine exhibits will either be excessive or insufficient with respect to the driving torque of the wheels, which fluctuates in accordance with the state of driving. Therefore, that amount is adjusted by the control of the electric motor. In this case, however, even if the torque of the engine can be made constant, the speed of the engine will be changed in accordance with the state of driving of the vehicle, therefore the exhaust emissions still cannot be sufficiently improved.

Contrary to this, a technology separately providing an electric motor at the driving shaft to maintain the torque generated by the engine at a predetermined value is disclosed in Japanese Unexamined Patent Publication No. 50-30223. However, the technology disclosed in this publication uses a plurality of sun-and-planet gear mechanisms, and therefore that structure becomes complex.

Further, Japanese Unexamined Patent Publication No. 05-008639 discloses a hybrid automobile having a simple structure as a whole in which an electric motor and a continuously variable transmission, referred to as a CVT, are mounted in the vehicle in place of the sun-and-planet gear mechanism. In this publication, it is described that a low fuel consumption and a low emission can be realized by stopping the engine at the time of deceleration, but no method is disclosed for freely controlling the output of the engine. Further, in this case, there is a problem in that the emission is considerably increased by the frequent stopping of the engine or the vibration and noise are increased due to the torque fluctuation generated at the stopping and starting of the engine.

SUMMARY OF THE INVENTION

An object of the present invention is to deal with the problems in the related art as mentioned above and to provide a control means for a hybrid vehicle with which the output of a heat engine such as an internal combustion engine can be freely controlled by a simple structure and with which the fuel consumption and the emission performance can be improved.

Another object of the present invention is to provide an improved hybrid vehicle provided with a control means that can prevent the deterioration of the exhaust emission by operating the heat engine, such as an internal combustion engine, under optimum operation conditions, such as a constant torque and constant speed, and, at the same time, can supply and adjust the driving force of the wheels, which may become excessive or insufficient, by an electric motor in accordance with the state of driving of the vehicle.

The present invention provides a hybrid vehicle as disclosed in the claims as a means for solving the above problems.

In the hybrid vehicle of an embodiment of the present invention, the torque transmitted by a driving shaft is distributed to an output shaft of a heat engine and the output shaft of an electric motor by any ratio by using a torque distributor and, at the same time, the ratio of the torque distribution can be freely changed. The vehicle is controlled so that both the torque and speed generated by the heat engine become any optimum values and, at the same time, the required driving torque and speed, which change in accordance with the driving conditions, can be supplied and adjusted by controlling the electric motor. By this, it becomes possible to continuously operate the heat engine under optimum conditions and to sufficient reduce the exhaust emission accompanying the operation of the heat engine.

More concretely, in the hybrid vehicle of another embodiment of the present invention, the torque distributor is controlled by the control means so that the torque of the output shaft of the heat engine always becomes a predetermined constant value. Further, the hybrid vehicle of yet another is controlled so that the speed of the output shaft of the heat engine always becomes a predetermined constant value by adjusting the speed of the output shaft of the electric motor by the control means for controlling the speed of the electric motor. By these means, it becomes possible to operate the heat engine with a constant torque and at a constant speed, therefore the exhaust emission can be sufficiently reduced by realizing operating conditions comprised by the optimum torque value and optimum speed for the heat engine.

In the hybrid vehicle of other embodiments of the present invention, as the torque distributor, more specifically a continuously variable transmission having a sun-and-planet cone is used. In this case, by sliding a ring in the axial direction to change the effective radius of the planet cone at the contact position with the ring, the ratio of distribution of the torque transmitted to the drive shaft to the output shaft of the heat engine and the output shaft of the electric motor can be smoothly changed and therefore it becomes possible to easily adjust the output shaft of the heat engine to the optimum operating conditions giving a constant torque and constant speed. By this, the exhaust emission can be sufficiently reduced.

According to another embodiment of the present invention, in the region of a vehicle speed of a predetermined value or more, that is, in the region where the outputs of the heat engine and the electric motor are both transmitted to the driving wheels, the speed of the heat engine can be maintained constant by controlling the transmission ratio of the continuously variable transmission with respect to the fluctuating vehicle speed and the torque of the heat engine can be maintained constant by controlling the torque of the electric motor with respect to the fluctuating driving force. Accordingly, the speed and torque of the heat engine can be maintained at the normal values within the range of the transmission ratio of the continuously variable transmission, and therefore a low fuel consumption and low emission can be realized.

Further, in another embodiment of the present invention, the vehicle is started by the output of only the electric motor at the start, the clutch is connected when the speed of the input shaft of the continuously variable transmission and the predetermined idling speed of the heat engine coincide, and then the output of the heat engine is transferred to the driving wheels of the vehicle. In the acceleration after this, the speed of the heat engine is smoothly raised up to the normal speed for giving the most preferred operating conditions. After the heat engine reaches the normal speed, the transmission ratio of the continuously variable transmission is controlled with respect to the fluctuating vehicle speed so as to maintain the speed by the output of the electric motor. By this, the speed and torque of the heat engine can be kept steady within the range of change of the transmission ratio of the continuously variable transmission and a low fuel consumption and low emission can be simultaneously realized.

When the means of another embodiment of the present invention are adopted, even if the speed of the driving shaft connected to the driving wheels fluctuates, the speed of the heat engine is held constant by the operation of the transmission, therefore the deterioration of the exhaust emission can be prevented without complicating the structure of the driving system.

Further, according to the means of another embodiment of the present invention, the required driving torque can be output from the electric motor while maintaining the torque generated by the heat engine constant, therefore the deterioration of the exhaust emission due to the torque fluctuation of the heat engine can be prevented without complicating the structure of the driving system.

BRIEF DESCRIPTION OF THE DRAWINGS

The present invention will be better understood by the following detailed explanation given with reference to the accompanying drawings, wherein:

FIG. 1 is a view of the configuration of a control system showing a first embodiment of a vehicle control unit of a hybrid automobile in the present invention;

FIG. 2A is an upper half of a flowchart of processing executed by an electronic control unit of first and second embodiments of the present invention;

FIG. 2B is a lower half of the flowchart of the processing executed by the electronic control unit of first and second embodiments of the present invention;

DESCRIPTION OF THE PREFERRED EMBODIMENTS

Figure 3:
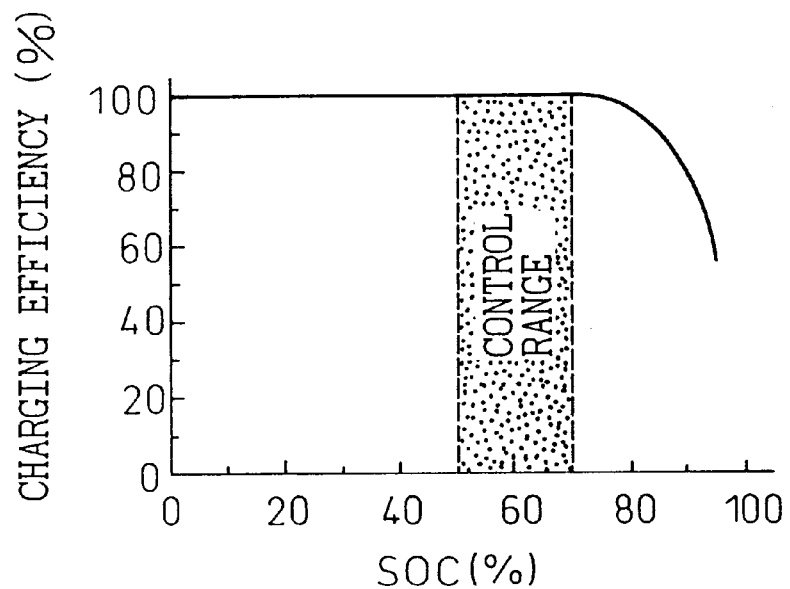
FIG. 3 is a graph of experimental data showing the relationship between a charging efficiency of a battery and a state of charging (SOC)

Preferred embodiments of the present invention will be explained next based on the drawings.

FIG. 1 is a view of the configuration of a control system showing a first embodiment of a vehicle control unit of a hybrid automobile according to the present invention. In the figure, the output shaft of an internal combustion engine (engine) 1 drives an oil pump 10 for supplying pressure to an oil pressure actuator for controlling the transmission ratio of a continuously variable transmission 3 and, at the same time, is connected to an input shaft of the continuously variable transmission 3. The output shaft of the continuously variable transmission 3 is connected to an input shaft of an electric motor (power generator) 2 via a clutch 9. An output shaft of the electric motor 2 is connected to a pair of driving wheels 8 via a differential gear 7.

The engine 1 is provided with a plurality of sensors serving as means for detecting the operating state of the engine, that is, a temperature sensor for detecting the cooling water temperature, an intake temperature sensor for detecting the intake air temperature, and a throttle position sensor for detecting the opening of the throttle valve. The output signals from the sensors, that is, a cooling water temperature signal S1, an intake temperature signal S2, and a throttle opening signal S3 are input to an input port of an electronic control unit (ECU) 4.

To the output shaft of the continuously variable transmission 3, a speed sensor for detecting the speed is attached. A speed signal S4 which is the output signal thereof is input to the input port of the ECU 4. Further, the vehicle speed is calculated from this speed signal S4, the deceleration ratio of the differential gear 7, and the effective radius of the tires.

A battery 6 is connected to the electric motor 2 via an inverter 5. The battery 6 supplies current to the electric motor 2.

The battery 6 is provided with a battery terminal voltage sensor for detecting the state of charging (SOC) of the battery, a current sensor, and a battery temperature sensor. An SOC signal S5 output from the battery 6 is input to the input port of the ECU 4. Further, at parts of the vehicle there are provided an accelerator switch for detecting the existence of the operation of an accelerator pedal, an accelerator sensor for detecting the opening of the accelerator, and a brake switch for detecting the existence of a braking operation. An accelerator switch signal S6, an accelerator opening signal S7, and a brake signal S8 which are output from these are input to the input port of the ECU 4. Note that, the accelerator switch and the brake switch output an ON signal when the respective operations are being performed.

The ECU 4 outputs a fuel injection control signal S9 to an injector performing the fuel injection, a throttle opening control signal S10 to a throttle actuator controlling the opening of a throttle valve, and oil pressure control signals S11 and S12 to the actuator controlling the transmission ratio of the continuously variable transmission 3 and the clutch 9 with respect to the engine 1 and outputs a field magnetic current control signal S13 controlling the output torque of the electric motor 2 to the inverter 5 based on these input signals. The continuously variable transmission 3 is controlled by the output signal of the ECU 4 which is an external signal. In the region more than a predetermined vehicle speed, that is, in the region where both of the output torques of the engine 1 and the electric motor 2 are transmitted to the driving wheels 8, the ECU 4 can control the speed of the engine 1 to a constant level by controlling the transmission ratio of the continuously variable transmission 3 with respect to the fluctuating vehicle speed. The ECU 4 can control the torque of the engine to a constant level by controlling the torque of the electric motor with respect to the fluctuating driving force.

Next, the mode of operation of the first embodiment of the present invention will be explained based on FIGS. 2A to FIG. 4. FIGS. 2A and 2B are connected and show a flowchart of the processing executed in the ECU 4 of the present embodiment. In this figure, first, to determine if the vehicle has started to be driven, the existence of an acceleration operation is decided at S101. Where the accelerator pedal is not operated, at S201, it is decided if the vehicle speed exceeds, for example, 10 km/h. Where it exceeds 10 km/h, it is decided that engine braking is necessary and the fuel of the engine 1 is cut (S204). Where it is 10 km/h or less, it is decided that the vehicle is immediately before stopping or is stopped and the clutch 9 is disengaged, that is, is turned OFF (S202). Then, the engine 1 is placed into an idling state (S203).

Further, where the accelerator pedal is operated at S101, the processing routine proceeds to S102, at which it is decided whether or not the vehicle speed exceeds, for example, 10 km/h. Where the vehicle speed is 10 km/h or less, the torque cannot be smoothly generated in the engine and therefore the clutch 9 is still disengaged, that is, is still OFF (S301), the engine 1 continues in the idling state (S302), and the vehicle is driven with the torque of only the electric motor 2 (S303).

On the other hand, where the vehicle speed exceeds 10 km/h, when the speed of the input shaft of the continuously variable transmission 3 and the idling speed of the engine 1 coincide, the clutch 9 is engaged, that is, is made ON (S103) and it is decided at S104 whether or not the vehicle speed exceeds, for example 20 km/h. Where the vehicle speed is 20 km/h or less, the transmission ratio icvt of the continuously variable transmission 3 is kept at the maximum (for example 2.5) (S111), and the vehicle speed is raised by raising the speed of the engine 1. The speed N of the engine 1 is calculated by the following equation where the transmission ratio of the differential gear 7 is idif and the effective radius of the tires of the driving wheels 9 is rtir:

$$N = V \times 60 \times idif \times icvt / (2 \times \pi \times rtir \times 3.6) \qquad (1)$$

When assuming that the transmission ratio of the continuously variable transmission 3 changes within a range of from for example 2.5 to 0.5, the upper limit of the vehicle speed at which the speed of the engine can be controlled to be constant becomes 100 km/h where the lower limit is 20 km/h. Therefore, at S105, it is decided whether or not the vehicle speed exceeds 100 km/h. Then, in the case of 100 km/h or less, the vehicle speed is raised while keeping the speed of the engine 1 constant by the control of the transmission ratio of the continuously variable transmission 3 (S106). Here, the transmission ratio icvt of the continuously variable transmission 3 is calculated by the following equation:

$$icvt = 2 \times \pi \times rtir \times 3.6 \times N / (V \times 60 \times idif) \qquad (2)$$

Next, where the vehicle speed exceeds 100 km/h, the transmission ratio icvt is kept at the minimum value (for example, 0.5), and the vehicle speed is raised by raising the speed of the engine 1 (S121). The speed of the engine 1 is calculated by an equation similar to that of the case where the vehicle speed is 20 km/h or less.

Figure 4:
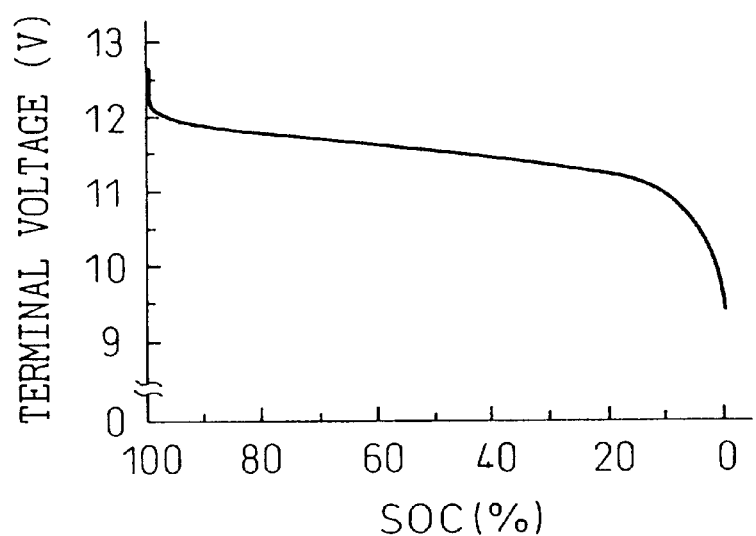
FIG. 4 is a graph of experimental data showing the relationship between a terminal voltage at the time of discharging the battery and the state of charging (SOC)
Figure 5:
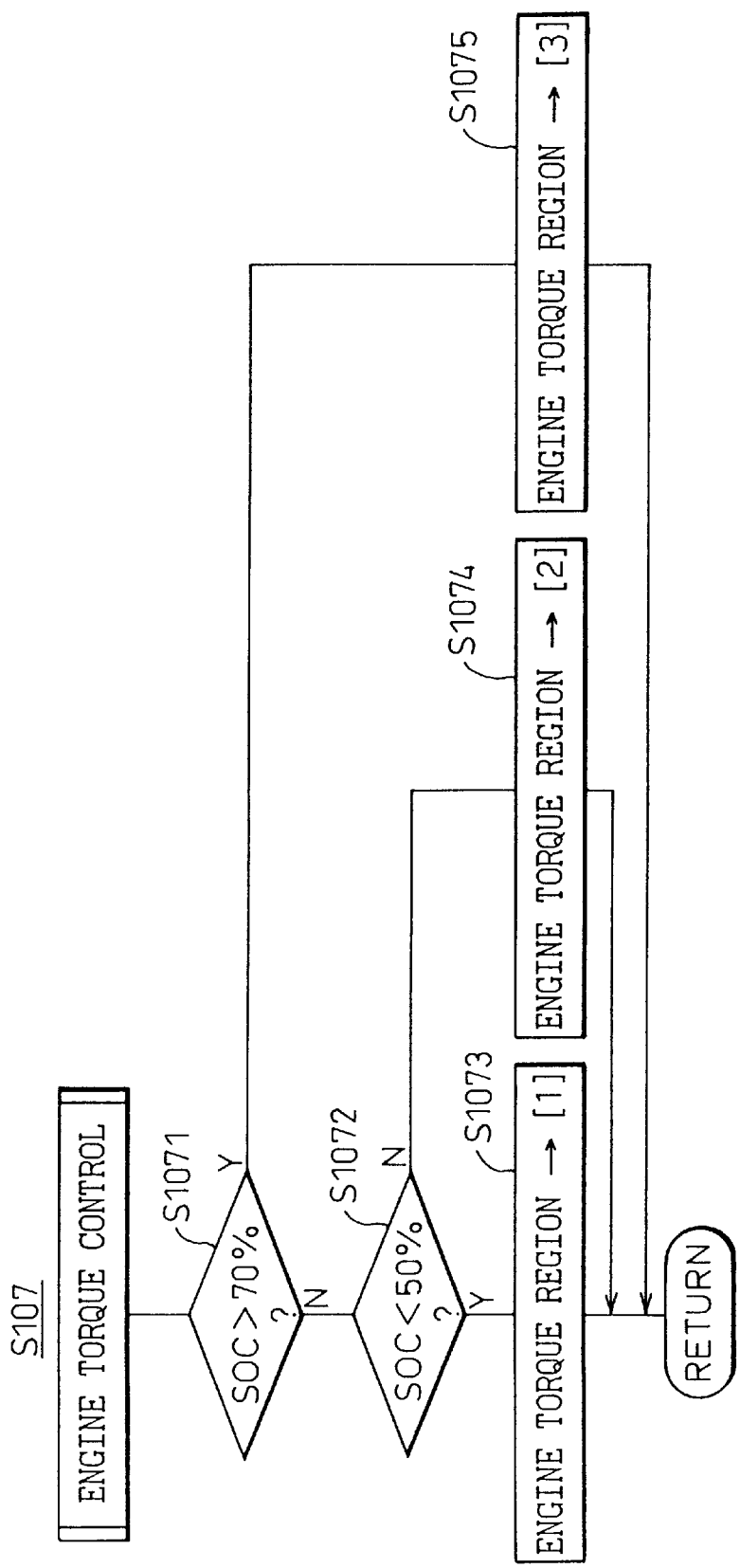
FIG. 5 is a flowchart of the torque control executed by the electronic control unit of an embodiment of the present invention.

Here, it has become clear from tests of batteries or the like that for example the charging efficiency of a lead battery is lowered when the SOC exceeds about 70%, as shown in FIG. 3. When the charging efficiency is lowered, the energy loss due to the charging becomes large, and therefore the fuel consumption is degraded. Conversely, when the SOC becomes small, as shown in FIG. 4, the voltage drop becomes large, and the discharged power is lowered. Accordingly, it is optimum if the SOC of the battery is controlled near 50 to 70%. Below, an explanation will be made of the torque control of the engine 1 for maintaining the SOC within a range of from 50 to 70% by using FIG. 5 showing the processing of S107.

Figure 6:
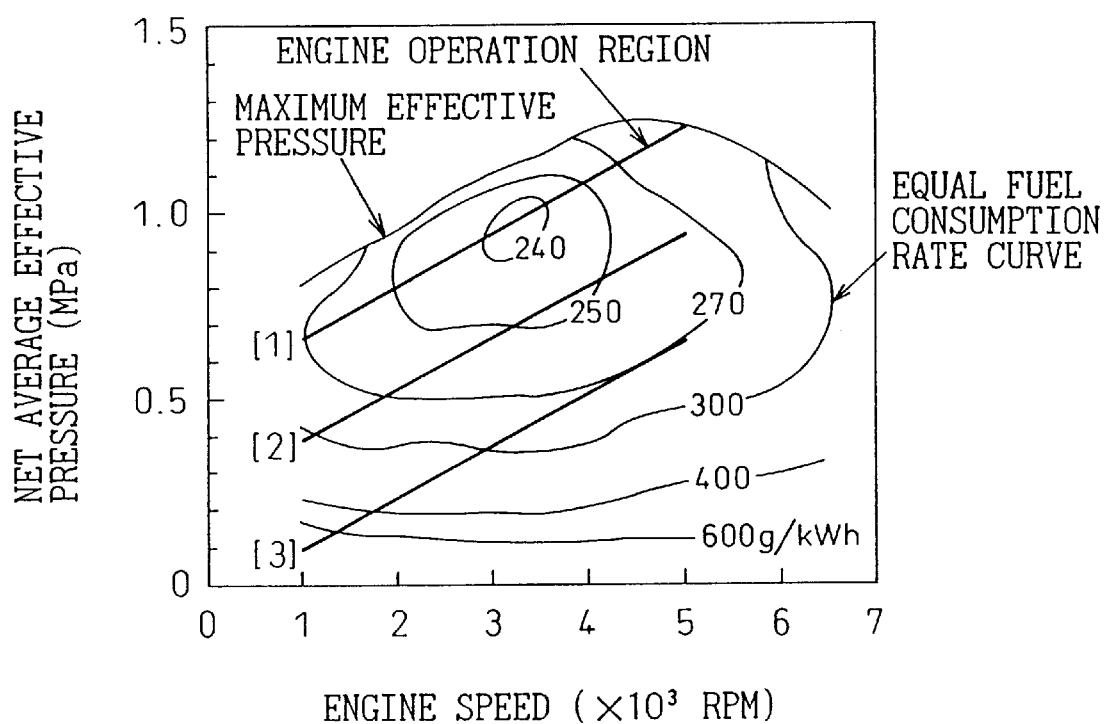
FIG. 6 is an explanatory view of a region of torque control of the engine executed by the electronic control unit of an embodiment of the present invention.

First, at S1071, where the SOC exceeds 70%, the processing routine proceeds to S1075, at which the torque control region of the engine 1 is minimized (line [3] of FIG. 6). Then, where SOC is 70% or less and exceeds 50%, the processing routine proceeds to S1074, at which the torque control region of the engine 1 is controlled by an intermediate line (line [2] of FIG. 6). Further, where the SOC is 50% or less, the processing routine proceeds to S1073, at which the torque control region of the engine 1 is made the maximum. By controlling the torque of the engine 1 in this way, the SOC of the battery can be maintained at near 50 to 70%.

When the torque of the engine 1 is controlled and the torque of the electric motor is controlled so as to become the difference between the load torque and the torque of the engine 1, the torque of the engine 1 can be made constant with respect to the fluctuating load torque. Further, when the vehicle speed is within a range of from 20 to 100 km/h, the speed of the engine 1 can be maintained constant, therefore, in most operation patterns, the engine 1 can perform the normal operation of outputting the constant speed and torque and therefore a low fuel consumption and low emission can be realized.

Figure 7:
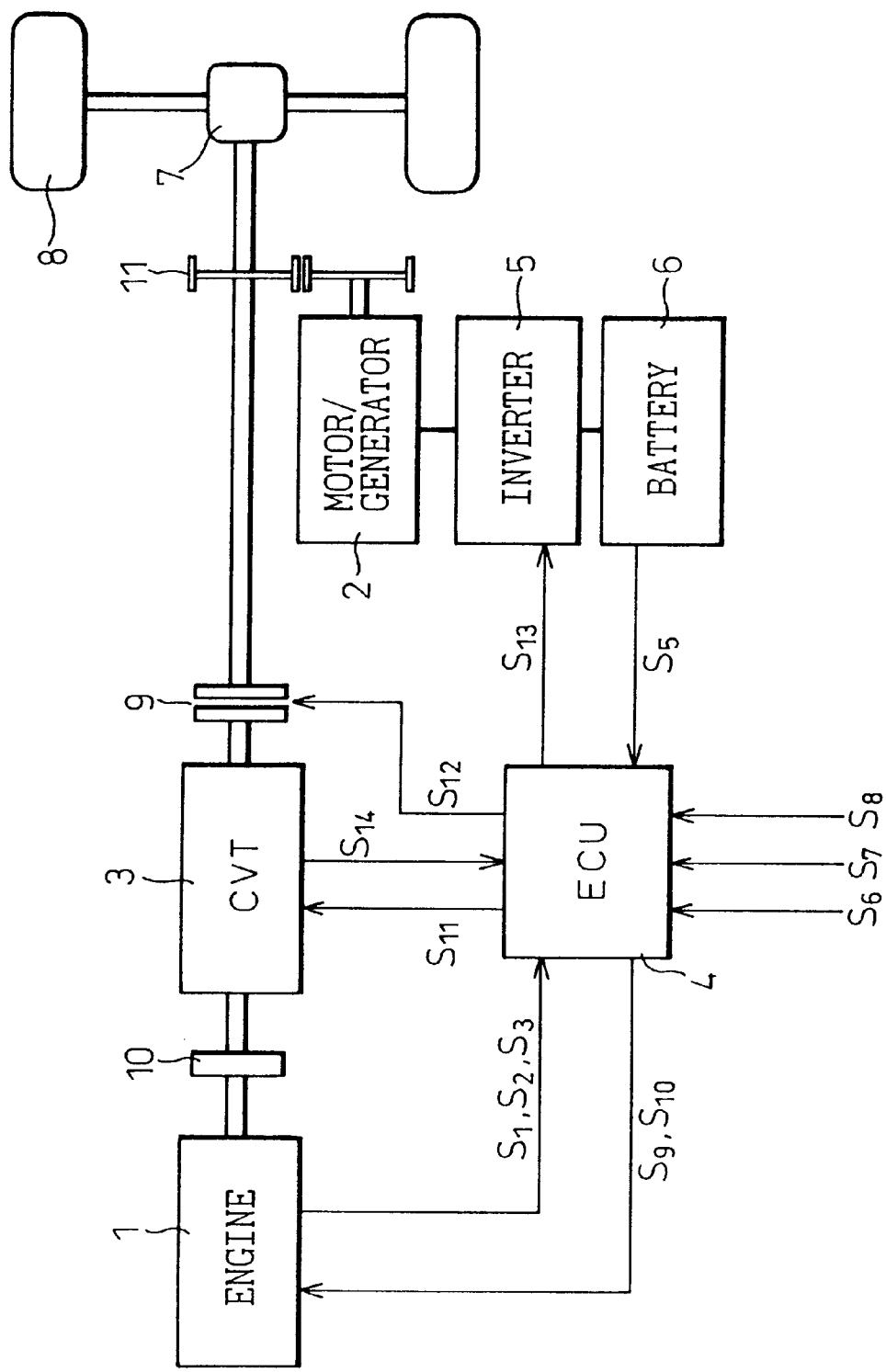
FIG. 7 is a view of the configuration of the control system showing a second embodiment of the present invention.

FIG. 7 shows a second embodiment of the present invention. In the present embodiment as well, similar to the first embodiment, the output shaft of the engine 1 drives the oil pump 10 and, at the same time, is connected to the input shaft of the continuously variable transmission 3 and the input shaft of the clutch 9 is connected to the output shaft of the continuously variable transmission 3. It is different from the first embodiment in that the output shaft of the clutch 9 is connected to the output shaft of the electric motor (power generator) 2 via the gear train 11 and, at the same time, connected via the differential gear 7 to the driving wheel 8.

Overlapping explanations will be omitted by assigning the same reference numerals or symbols to structural parts common to the first embodiment. Also the second embodiment exhibits substantially the same mode of operation and effects as those of the first embodiment. Note that this is also true for the other embodiments mentioned later.

Figure 8:
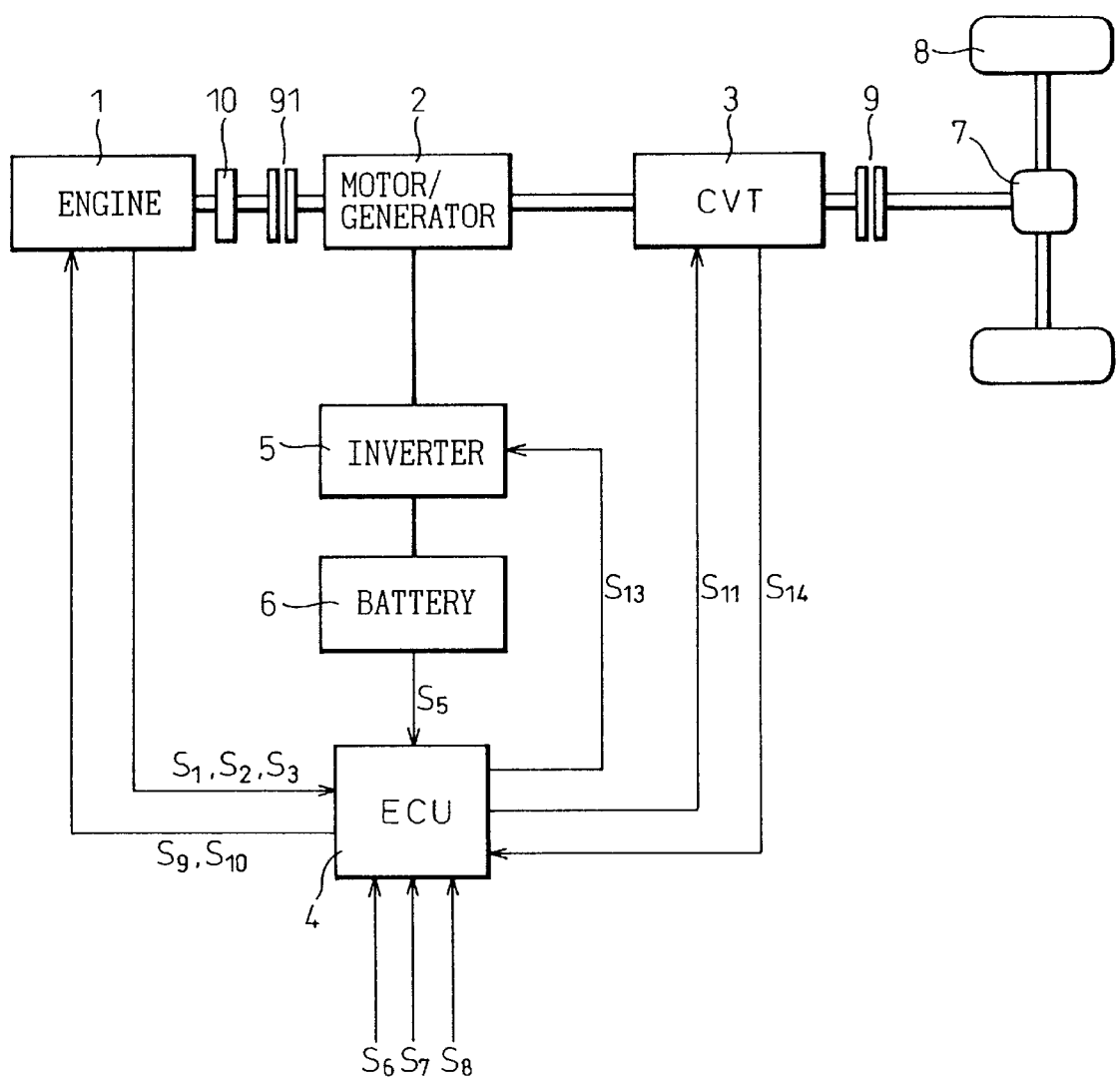
FIG. 8 is a view of the configuration of the control system showing a third embodiment of the present invention.

FIG. 8 shows a third embodiment of the present invention. In the present embodiment, the output shaft of the engine 1 is connected so as to drive the oil pump 10 and, at the same time, is connected to the input shaft of the clutch 91. The output shaft of the clutch 91 is connected to the input shaft of the electric motor (power generator) 2, the output shaft of the electric motor 2 is connected to the input shaft of the continuously variable transmission 3, and the driving wheels 8 are connected to the output shaft of the continuously variable transmission 3 via the clutch 9 and the differential gear 7.

Figure 9:
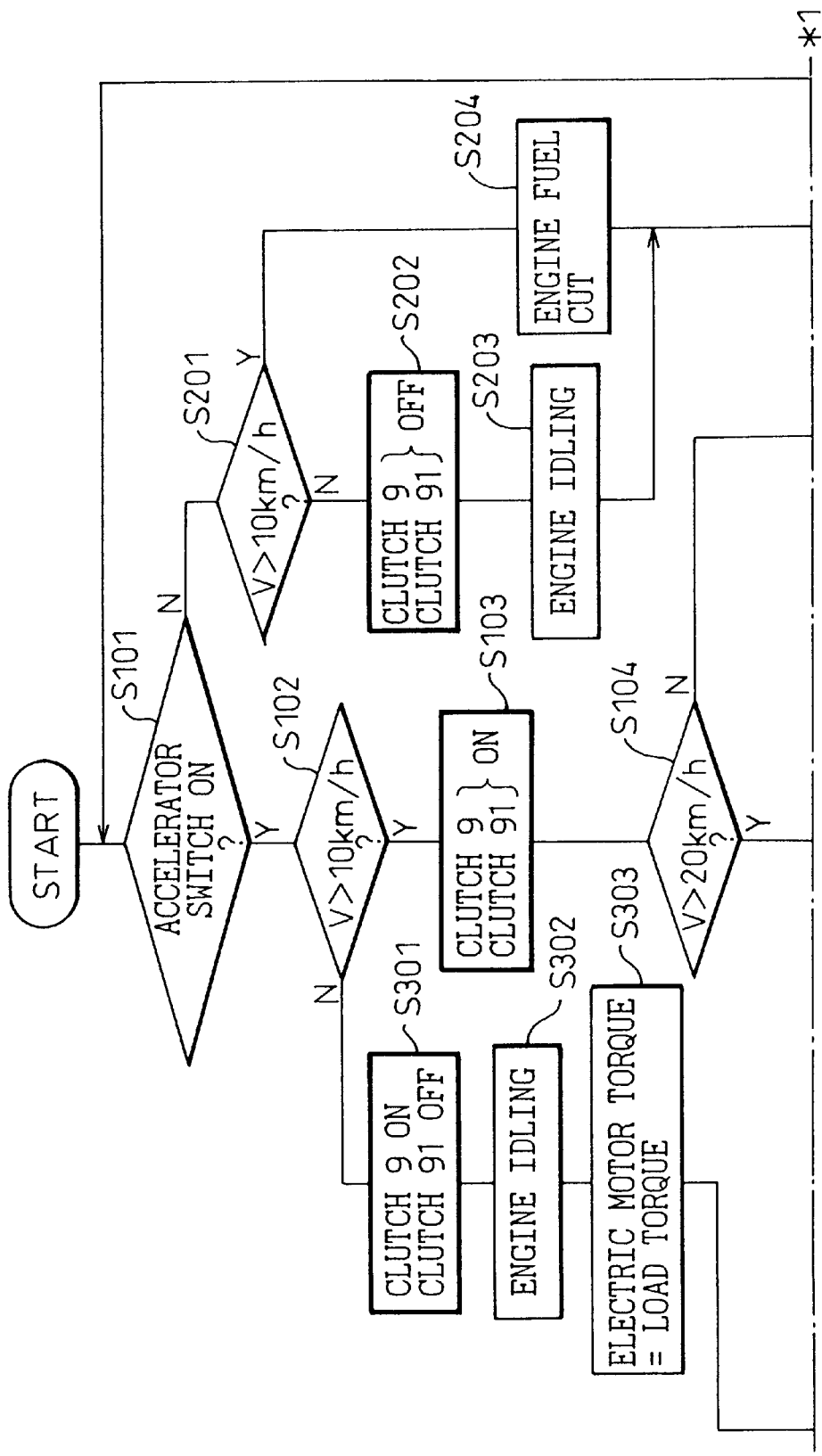
FIG. 9 is an upper half of the flowchart of the processing executed by the electronic control unit of the third and fourth embodiments of the present invention.

Next, the mode of operation of the third embodiment of the present invention will be explained based on the flowchart shown in FIG. 9. The present embodiment differs from the first embodiment (FIGS. 2A, 2B) in the part where both of the clutch 9 and clutch 91 are disengaged, that is, made OFF at S202 when it is decided at S201 that the vehicle speed is 10 km/h or less, the part where both of the clutch 9 and the clutch 91 are engaged, that is, are made ON at S103 when it is decided at S102 that the vehicle speed exceeds 10 km/h, and the part where the clutch 9 is engaged at S301, that is, made ON and, at the same time, the clutch 91 is disengaged, that is, made OFF when it is decided at S102 that the vehicle speed is 10 km/h or less. Note that the processing of the lower half following FIG. 9 is the same as that in the first embodiment shown in FIG. 2B, therefore a re-illustration of the flowchart of the lower half will be omitted.

Figure 10:
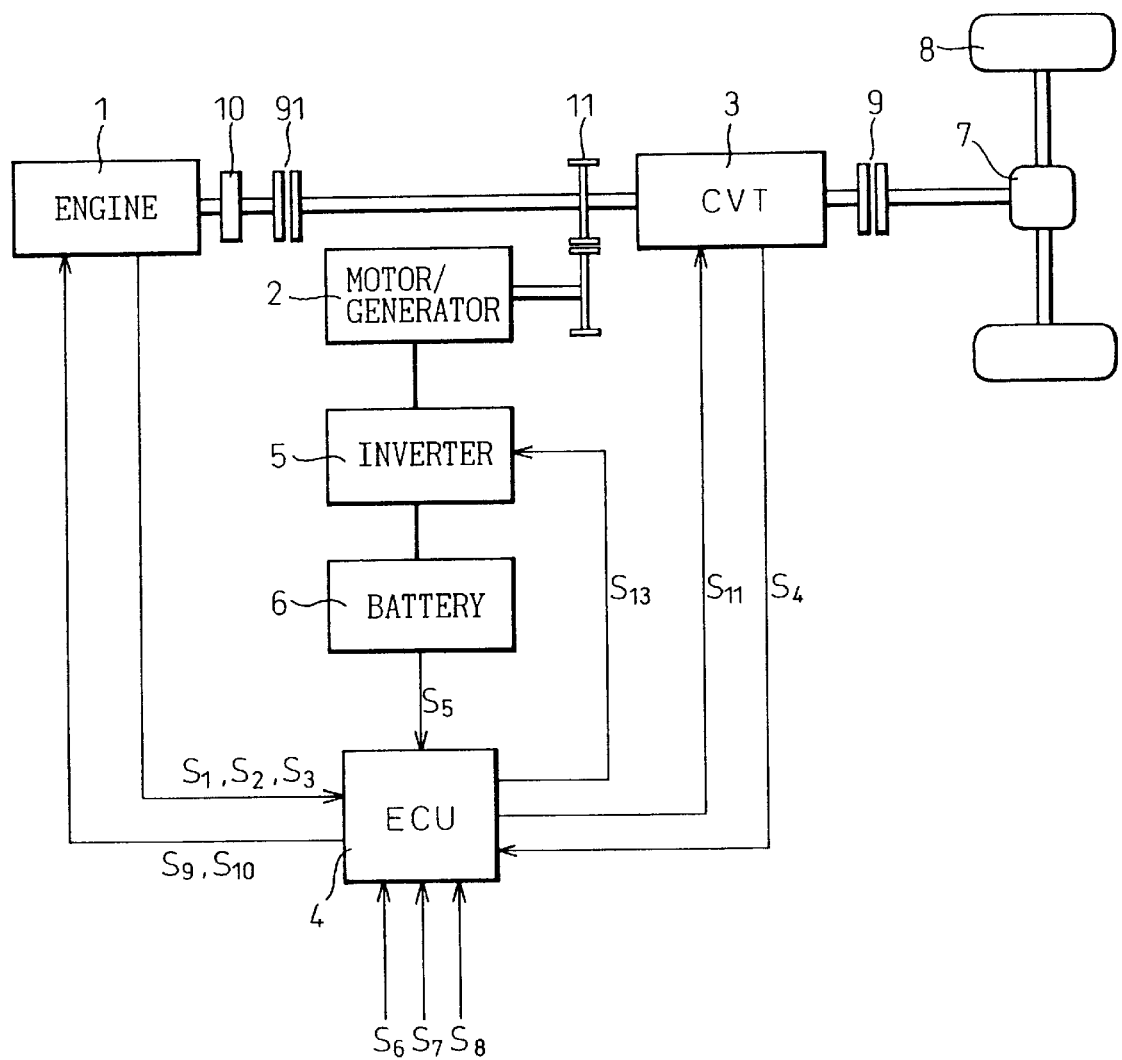
FIG. 10 is a view of the configuration of the control system showing a fourth embodiment of the present invention.

FIG. 10 shows a fourth embodiment of the present invention. In the present embodiment, the output shaft of the engine 1 is connected so as to drive the oil pump 10 and, at the same time, is connected to the input shaft of the clutch 91. The output shaft of the clutch 91 is connected to the output shaft of the electric motor (power generator) 2 via the gear train 11 and, at the same time, connected to the input shaft of the continuously variable transmission 3. Only the part where the driving wheels 8 are connected to the output shaft of the continuously variable transmission 3 via the clutch 9 and the differential gear 7 is different from the case of the third embodiment. However, the flowchart of control is the same as that of the third embodiment. The upper half becomes as in FIG. 9, and the lower half becomes as in FIG. 2B.

The fifth embodiment and the sixth embodiment of the present invention will be explained next based on the drawings.

Figure 11:
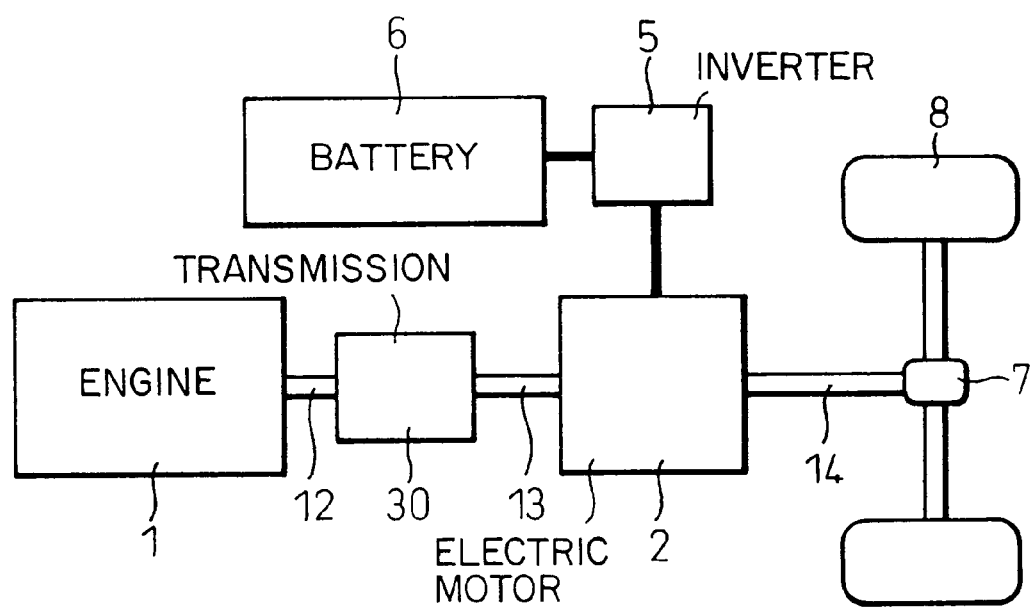
FIG. 11 is a schematic view of the configuration of a fifth embodiment and a sixth embodiment of the present invention.

FIG. 11 is a schematic view of the fundamental configuration of a hybrid vehicle common to these embodiments. This configuration resembles that of FIG. 1 showing the first embodiment. In FIG. 11, the output shaft 12 of the heat engine for converting the heat energy to the driving force, for example, the engine 1, is connected to the input shaft of the transmission 30, the output shaft of the transmission 30 is connected to an output shaft 13 of apparatus for converting electric energy to a driving force, for example, the electric motor 2, the other end of the output shaft 13 is connected to the driving wheels 8 through the drive shaft 14 and the differential gear 7, and the generated torques of the engine 1 and the electric motor 2 are transmitted to the driving wheels 8. The electric motor 2 is connected to the battery 6 through the inverter 5. A not illustrated controller such as an ECU for controlling the inverter 5 is added to this. When the electric motor 2 generates a torque, the battery 6 discharges, and conversely, when the electric motor 2 acts as the power generator and absorbs the torque, the battery 6 is charged. The transmission 30 can automatically change the transmission ratio in accordance with the speed of the output shaft 13 on the electric motor 2 side. The speed of the output shaft 12 of the engine 1 is controlled constant by the transmission 30. Further, the torque generated by the engine 1 is always set constant. The difference between the torque of the driving wheels necessary for driving the vehicle and the torque of the output shaft of the transmission 30 (changing according to the transmission ratio) is generated by the electric motor 2 under the control of the inverter 5 by the not illustrated controller.

Figure 12:
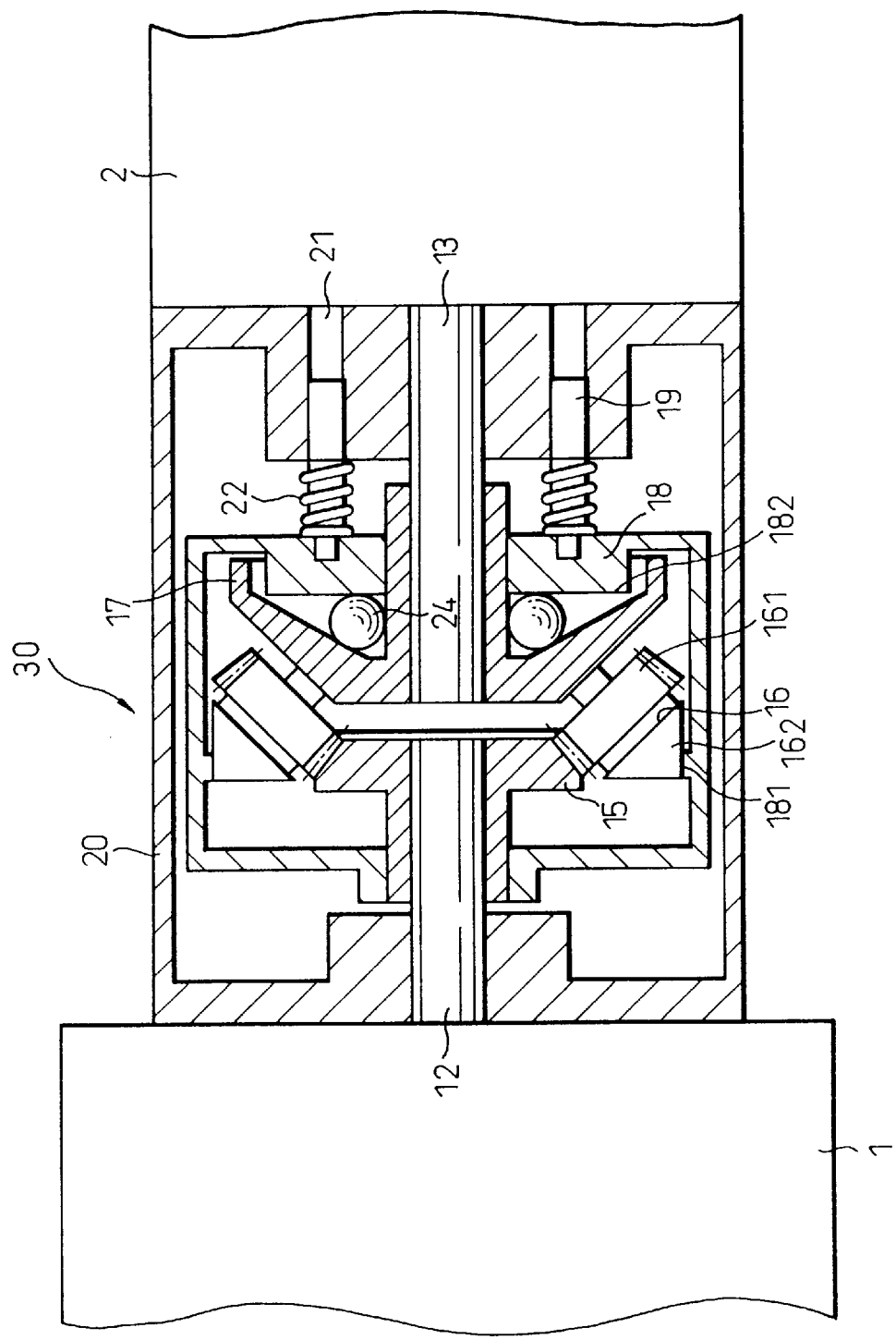
FIG. 12 is a sectional view of the state where the speed of the output shaft of the transmission used in the fifth embodiment of the present invention is low.
Figure 13:
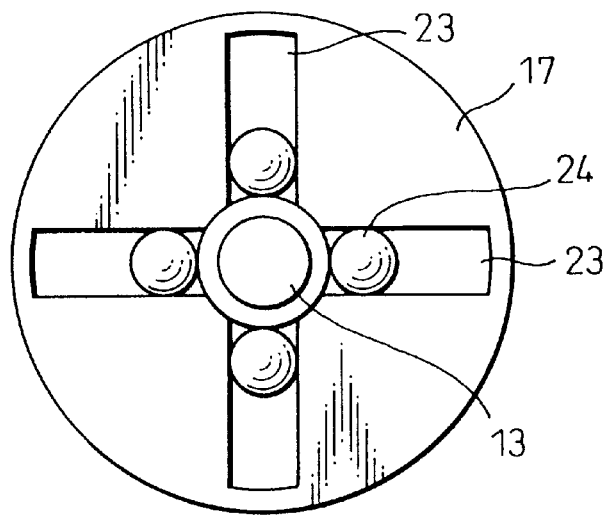
FIG. 13 is a side view of the principal parts of the transmission shown in FIG. 12.
Figure 14:
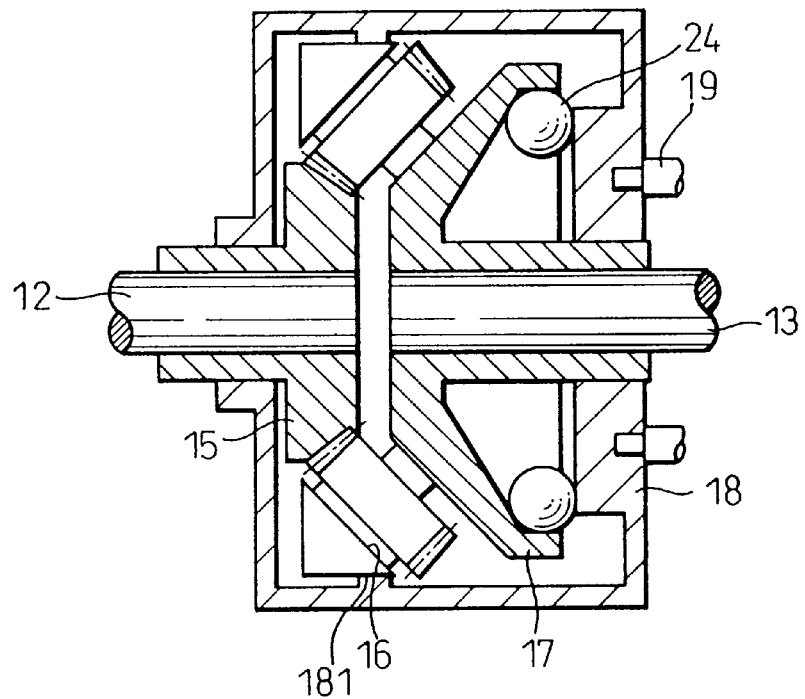
FIG. 14 is a sectional view of the state where the speed of the output shaft of the transmission used in the fifth embodiment is high.

Next, the concrete internal configuration of the transmission 30 used in the fifth embodiment of the present invention will be explained based on FIG. 12 to FIG. 14. The output shaft 12 of the engine 1 is fixed to a bevel gear 15. The bevel gear 15 engages with another bevel gear 161 provided at the sun-and-planet cone 16. The sun-and-planet cone 16 is rotatably supported by a carrier 17. The carrier 17 is fixed to the common output shaft 13 of the electric motor 2 and the transmission 30. The output shaft (not illustrated) on the opposite side of the electric motor 2 is connected to the drive shaft 14. A cone portion 162 is formed on the tip of the sun-and-planet cone 16. The outer peripheral surface of the cone portion 162 is in contact with an annular projection portion 181 formed on the inner surface of a slide ring 18 which can slide in the axial direction. A plurality of holes are formed in the side surface of the slide ring 18 on the electric motor 2 side. One end of a stopper pin 19 of the slide ring 18 is fit in the hole. The stopper pin 19 is slidably inserted into the hole 25 made in the side wall of a housing 20 on the electric motor 2 side. Further, a spring 22 is provided on the outer periphery of the stopper pin 19. The spring 22 usually biases the slide ring 18 in the direction of the engine 1 (left side in the figure). Further, a plurality of, for example, four diameter direction grooves 23 are formed in the side surface of the carrier 17 on the electric motor 2 side as shown in FIG. 13. Balls 24 are rotatably held between the inner surface of the grooves 23 and the inside end surface 182 of the slide ring 18. The grooves 23 are formed inclined so that the nearer the output shaft 13, the deeper the depth of the groove 23, and the farther from the output shaft 13, the shallower the depth.

Accordingly, when the electric motor 2 stops or is in a low speed rotation state, the balls 24 do not receive any centrifugal force or even if they receive a centrifugal force, the influence thereof is small, therefore the balls 24 are located near the output shaft 13, and the slide ring 18 does not move. As a result, in the state as shown in FIG. 12, the torque of the output shaft 13 of the electric motor 2 is transmitted to the bevel gear 161 of the sun-and-planet cone 16 via the carrier 17. Therefore, if there is a difference between the speed of the output shaft 13 of the electric motor 2 and the speed of the output shaft 12 of the engine 1, the sun-and-planet cone 16 rotates while revolving. In this way, the torque is transmitted between the output shaft 12 and the output shaft 13. At this time, the projection portion 181 in the slide ring 18 is in contact with the minimum effective radius part of the cone portion 162, therefore the transmission ratio of the transmission 30, that is, the deceleration ratio, has becomes the largest.

Conversely, when the speed of the electric motor 2 rises and becomes the maximum, the speed of the carrier 17 rises to the maximum value and a large centrifugal force acts on the balls 24, therefore the balls 24 move most outwardly in the diameter direction while rotating. For this reason, the slide ring 18 moves to the electric motor 2 side (right side in FIG. 14) against the biasing force of the spring 22, and the projection portion 181 inside the slide ring 18 comes into contact with the part of the cone portion 162 having the maximum effective radius, therefore the deceleration ratio of the transmission 30 becomes the smallest. In this way, the speed of the output shaft 12 on the engine 1 side is always controlled constant.

Next, an explanation will be made of the mode of operation where the transmission 30 used in the fifth embodiment of the present invention is mounted in the hybrid vehicle as shown in FIG. 11.

First, when the vehicle speed of the hybrid vehicle rises, the speed of the driving shaft 14 is increased, and the speed of the output shaft 13 of the electric motor 2 rises. By this, the speed of the carrier 17 similarly rises, therefore the balls 24 rotate around the output shaft 13 and receive the centrifugal force. When the balls 24 move outward in the diameter direction along the grooves 23 by the centrifugal force, the slide ring 18 moves to the electric motor 2 side (right side in FIG. 12) against the biasing force of the spring 22. For this reason, as mentioned before, the contact point of the cone portion 162 and the projection portion 181 inside the slide ring 18 moves to the right side in FIG. 12, and the effective radius of the cone portion 162 becomes larger, therefore the deceleration ratio of the transmission 30 becomes small. That is, when the speed of the transmission 30 on the output shaft side (side of the electric motor 2) rises, the deceleration ratio of the transmission 30 becomes small, therefore the speed of the output shaft 12 of the engine 1 can be always held constant.

Conversely, when the vehicle speed of the hybrid vehicle is lowered, the speed of the drive shaft 14 is reduced and the speed of the output shaft 13 of the electric motor 2 is reduced. By this, the speed of the carrier 17 is similarly reduced, therefore also the centrifugal force of the balls 24 is lowered, and the balls 24 centripetally move to the output shaft 13 side along the grooves 23. For this reason, by the action of the biasing force of the spring 22, the slide ring 18 moves to the engine 1 side (left side in FIG. 12), the contact point between the cone portion 162 and the projection portion 181 inside the slide ring 18 moves to the left side in the figure, and the effective radius of the cone portion 162 becomes small, therefore the deceleration ratio of the transmission 30 becomes large. That is, when the speed of the transmission 30 on the output shaft side (side of the electric motor 2) is reduced, the deceleration ratio of the transmission 30 becomes large, therefore the speed of the input shaft side of the transmission 30, that is, the speed of the output shaft of the engine 1 can be held constant.

As described above, the transmission can automatically change the transmission ratio in accordance with the change of the speed of the output shaft to which the electric motor is connected, therefore the vehicle can be controlled so that the speed of the output shaft of the engine becomes constant.

Further, concerning the torque, the difference between the torque found by multiplying the torque generated (constant value) by the engine 1 by the deceleration ratio of the transmission 30 and the torque necessary for driving is generated by the electric motor 2 under the control of the inverter 5 by a controller like a not illustrated ECU.

As described above, according to the fifth embodiment of the present invention, in a driving system constituted by an engine, transmission, and one electric motor, the generated torque and speed of the engine can be held constant. In addition, an excellent hybrid vehicle having a low fuel consumption and low emission can be constituted by a simple configuration in which the engine and the drive shaft are mechanically connected.

Note that, in the fifth embodiment, the generated torque of the engine 1 was set at a constant value, but it is also possible to make this value variable according to the state of charging etc. of the battery 6. In short, control may be performed so that the torque of the engine does not follow the state of driving of the vehicle in real time, but becomes a predetermined value set in advance according to certain conditions.

Figure 15:
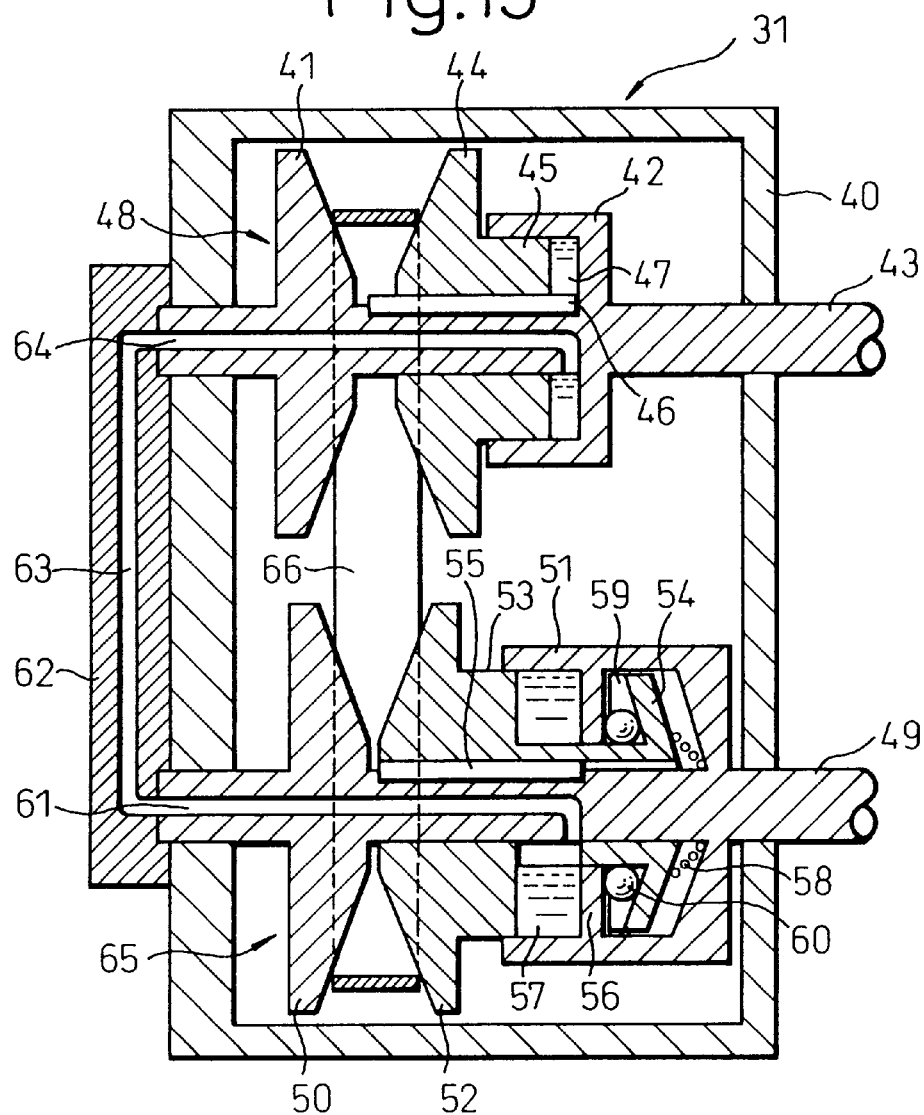
FIG. 15 is a sectional view of the state where the speed of the output shaft of the transmission used in the sixth embodiment of the present invention is low.

Next, the configuration of the transmission used in the sixth embodiment of the present invention will be explained based on FIG. 15 to FIG. 17. In the fifth embodiment, a continuously variable transmission comprising a ring and sun-and-planet cone was used as the transmission 30 in FIG. 11, but in the sixth embodiment, a continuously variable transmission 31 using a so-called variable pitch pulley is used as the transmission. In FIG. 15, the output shaft 12 of the engine 1 (refer to FIG. 11) is connected to the input shaft 43 which is arranged in the housing 40 of the transmission 31 and integrally formed with one cone portion 41 and cup portion 42. The input shaft 43 penetrates through the center of the piston 45 having the other cone portion 44 facing the cone portion 41. The piston 45 is inserted into the cup portion 42 so that it can freely slide in the axial direction and in a fluid-tight manner and rotates integrally with the input shaft 43 in the rotation direction by a key 46 disposed on the input shaft 43. Further, an input side oil chamber 47 is formed between the piston 45 and the cup portion 42 and is filled with oil. A variable pitch pulley 48 on the input side is constituted by one cone portion 41 and the other cone portion 44.

The output shaft 13 of the electric motor (refer to FIG. 11) is connected to the output shaft 49 arranged in the housing 40 of the transmission 31. One cone portion 50 and the cup portion 51 are integrally formed with the output shaft 49. The output shaft 49 penetrates through the center of the piston 53 having the other cone portion 52 facing the cone portion 50 and a flange 54. The piston 53 is slidably inserted into the cup portion 51 so that it can freely slide in the axial direction and rotates integrally with the output shaft 49 in the rotation direction by the key 48 disposed on the output shaft 49. A partition plate 50 is provided in the cup portion 51. An output side oil chamber 49 is formed between the piston 53 and the partition plate 50 and is filled with oil. Further, a spring 58 is arranged between the bottom surface of the cup portion 51 and the flange 54 and presses against the flange 54 and the piston 53 leftward in FIG. 15.

Figure 16:
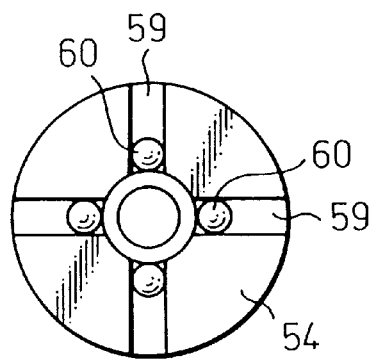
FIG. 16 is a side view of the principal parts of the transmission shown in FIG. 15.

In FIG. 15, on the left side surface of the flange 54, as shown in FIG. 16, a plurality of, for example, four diameter direction grooves are formed. Balls 60 are held between the interior of the grooves 59 and the partition plate 56. The grooves 59 are formed inclined so that the nearer the output shaft 49 at the center, the deeper the depth of the grooves 59 in the axial direction, and the farther from the output shaft 49 in the radial direction, the shallower the depth. Further, an oil flow path 61 is formed at the center of the output shaft 49, and the output side oil chamber 57 is communicated with an oil passage 63 in the parts 62 disposed on the side surface of the housing 40 via the oil flow path 61. On the other hand, an oil flow path 64 is similarly formed at the center of the input shaft 43, and the input side oil chamber 47 is communicated with the oil passage 63 in the parts 62 via the oil flow path 64. Then, the cone portion 50 and the cone portion 52 constitute a variable pitch pulley 65 on the output side. A belt 66 is wound around between the variable pitch pulley 48 on the input side and the variable pitch pulley 65 on the output side. Note that, FIG. 15 shows a state where the speed of the output shaft 13 of the electric motor (refer to FIG. 11) is low or the output shaft 13 does not rotate, and FIG. 17 shows a state where the speed of the output shaft 13 of the electric motor is extremely high and the balls 60 receives a large centrifugal force and move outward in the diameter direction.

Next, an explanation will be made of mode of operation of the case where the transmission 31 in the sixth embodiment of the present invention is used in place of place of the transmission 30 of the hybrid vehicle shown in FIG. 11. As shown in FIG. 15, when the speed of the output shaft 49 of the transmission 31 connected to the output shaft 13 of the electric motor is low, the centrifugal force acting upon the balls 60 is small, and therefore the balls 60 are located near the output shaft 49, and the piston 53 moves to the left side in FIG. 15 by the biasing force of the spring 58. By this, part of the oil of the input side oil chamber 47 moves to an enlarged output side oil chamber 57 through the oil flow path 64, the oil passage 63, and the oil flow path 61, and therefore the piston 45 on the input shaft 43 side moves to the right side in FIG. 15. Accordingly, the interval between the cone portion 41 and the cone portion 44 constituting the variable pitch pulley 48 on the input side is enlarged, while the interval between the cone portion 50 and the cone portion 52 constituting the variable pitch pulley 65 on the output side becomes smaller. By this, the effective radius of the variable pitch pulley 48 upon which the belt 60 is wound and hung becomes smaller and, at the same time, the effective radius of the variable pitch pulley 65 on the output side becomes large, therefore the deceleration ratio of the transmission 31 becomes larger.

Figure 17:
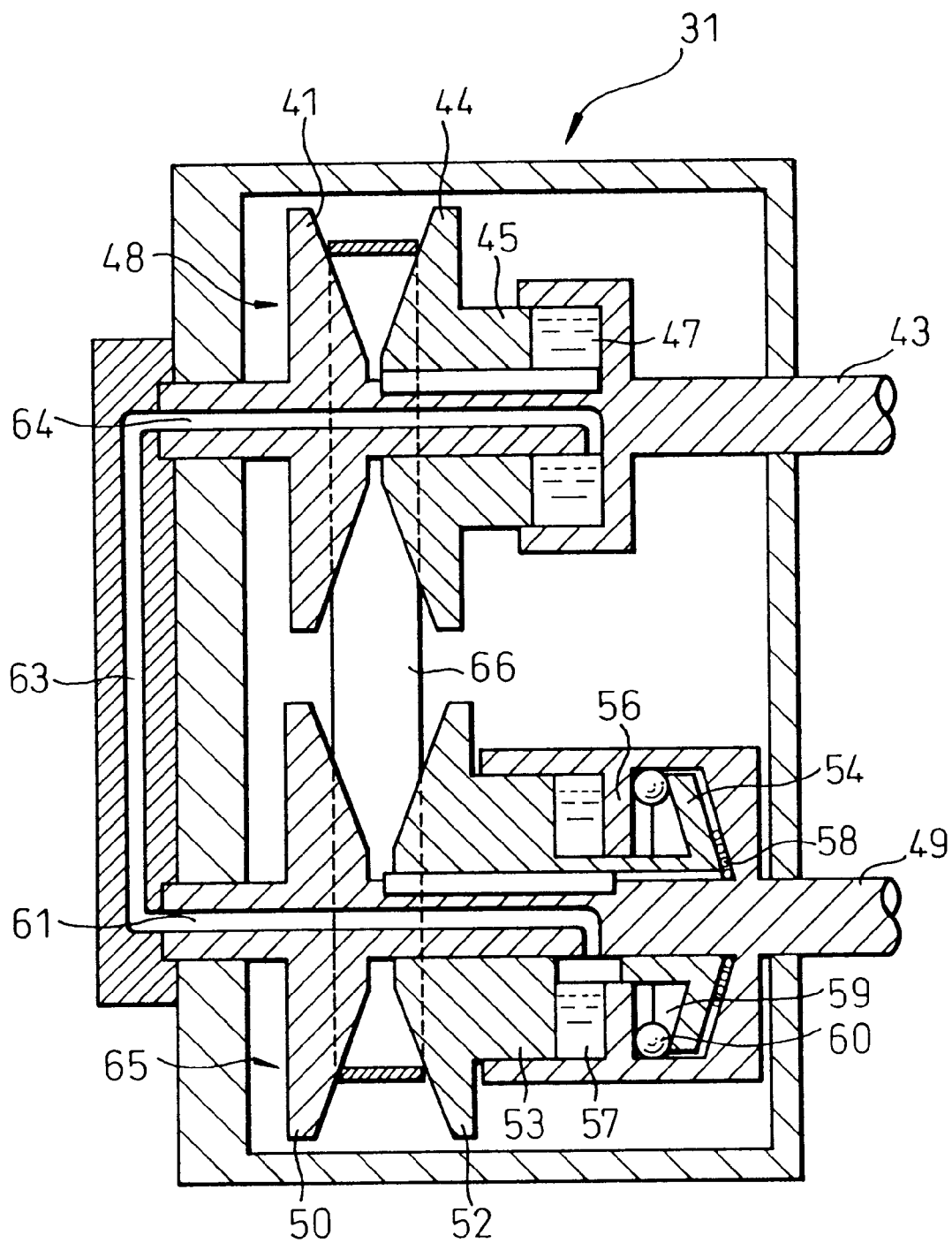
FIG. 17 is a sectional view of the state where the speed of the output shaft of the transmission used in the sixth embodiment is high.

Conversely, when the speed of the output shaft 13 of the electric motor rises, as shown in FIG. 17, the balls 60 receive a large centrifugal force and move outward in the diameter direction along the inclined grooves 59. By this, the piston 53 on the output shaft 49 side moves to the right side in FIG. 17 against the biasing force of the spring 58. Therefore in contrast to the case where the speed of the output shaft 49 is low as mentioned above, the effective radius of the variable pitch pulley 48 upon which the belt 60 is wound and hung becomes larger and, at the same time, the effective radius of the variable pitch pulley 65 on the output side becomes smaller, therefore the transmission ratio (deceleration ratio) of the transmission 31 becomes smaller.

As described above, in the transmission 31 of the sixth embodiment, the lower the speed of the output shaft 13 of the electric motor, the larger the deceleration ratio, and conversely, the higher the speed of the output shaft 13, the smaller the deceleration ratio. Therefore the speed of the input shaft 43 to which the engine is connected can be controlled constant.

Namely, the transmission 31 can automatically change the transmission ratio in accordance with the change of the speed of the output shafts 13 and 49 to which the electric motor is connected, therefore the speed of the input shaft 43 to which the engine is connected can be controlled constant.

Figure 18:
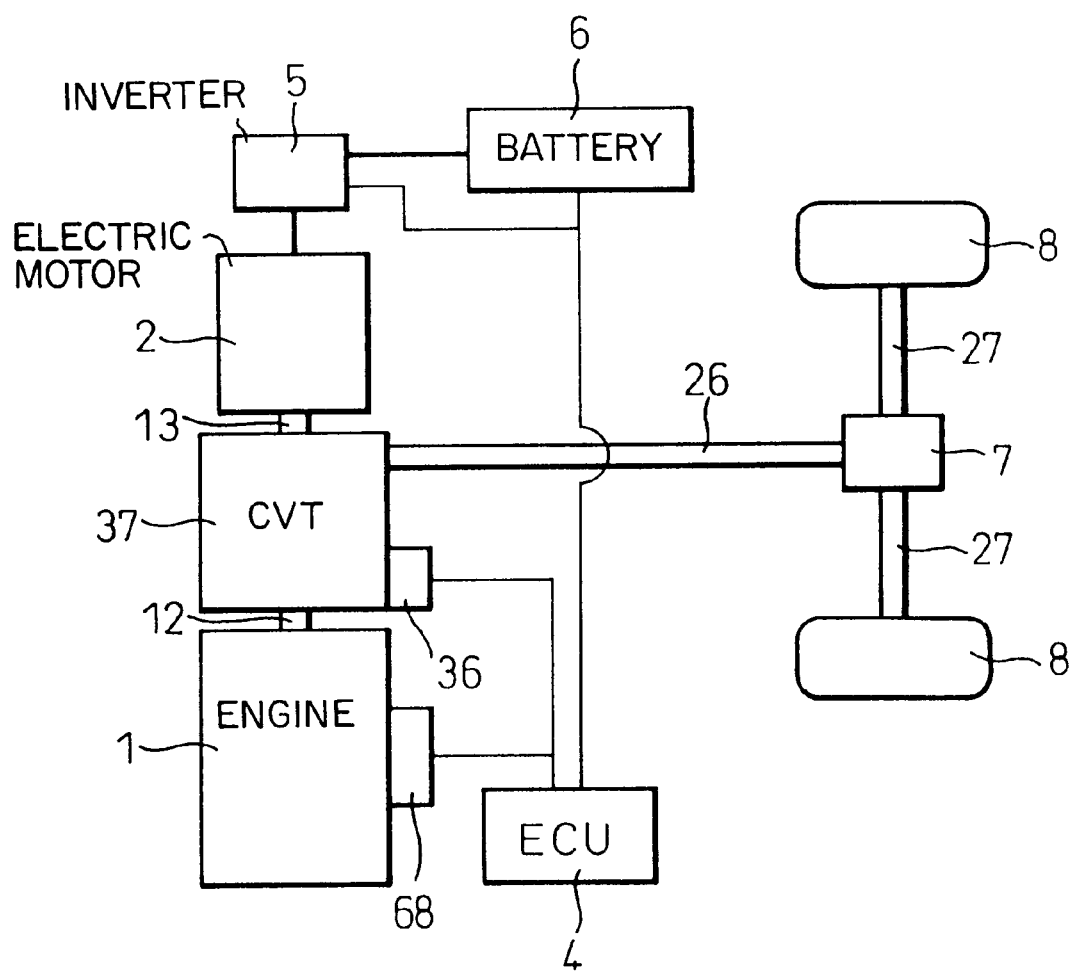
FIG. 18 is an overall view of the configuration of a seventh embodiment of the present invention.

A seventh embodiment of the present invention is shown in FIG. 18. The output shaft 12 of the engine 1 (for example a gasoline engine) and the output shaft 13 of the electric motor 2 are connected to a continuously variable transmission (CVT) 37. The drive shaft 26, which is the output shaft of the continuously variable transmission 37, is connected to the left and right driving wheels 8 via the differential gear 7 and a pair of drive shafts 27 of the wheel. The inverter 5 and the battery 6 are electrically connected to the electric motor 2, the electric motor 2 is driven by the electric power stored in the battery 6, or the battery 6 is charged by the electric motor 2 which acts as a power generator. Note that, 4 is an electronic control unit (ECU), and 28 is a throttle actuator operating the throttle valve for the output control of the engine 1.

Figure 19:
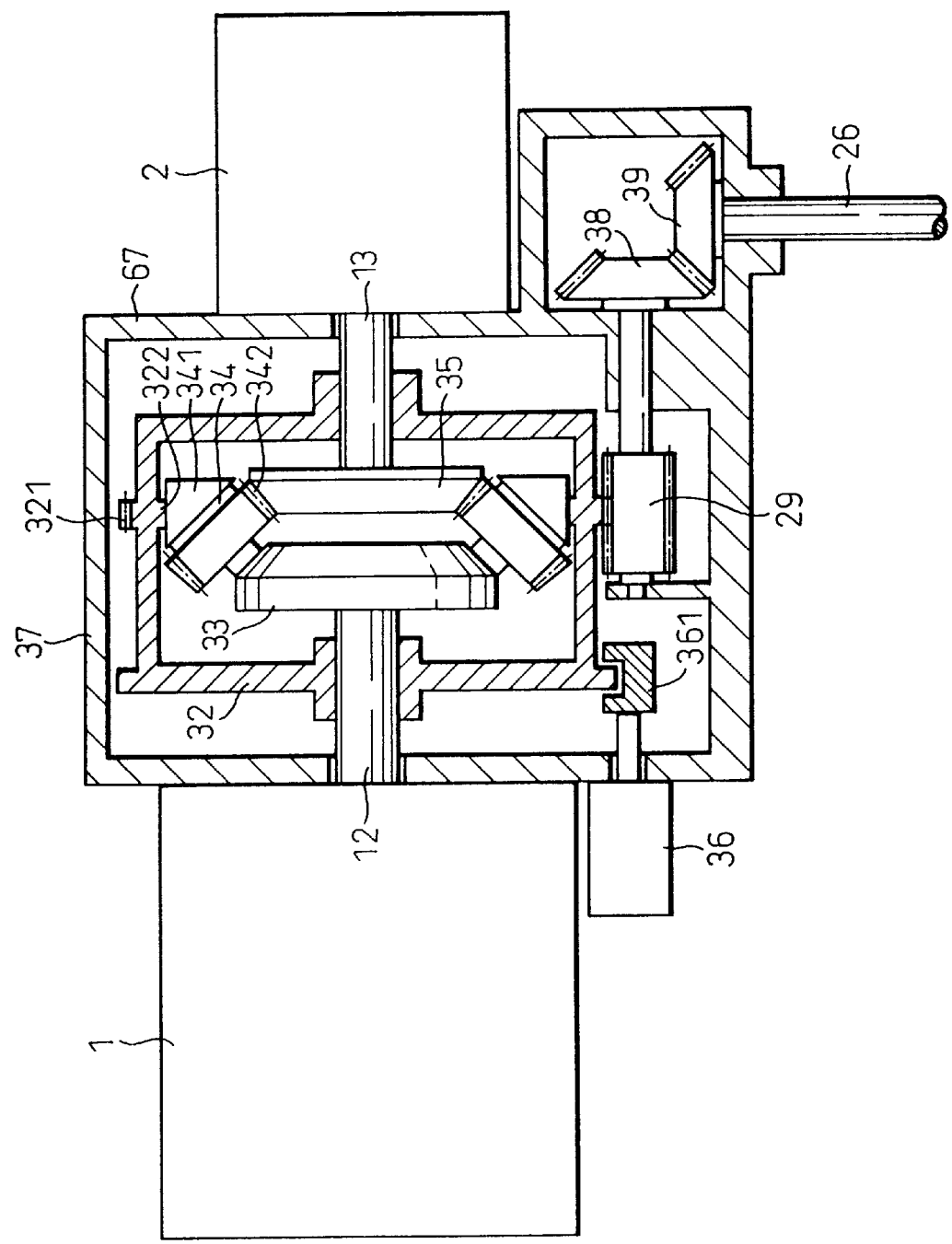
FIG. 19 is a partial vertical sectional view of the principal parts of the seventh embodiment.

The configuration of the internal portion of the continuously variable transmission 37 is shown in FIG. 19. The continuously variable transmission 37 applies well known continuously variable transmission using a sun-and-planet cone and a ring which comes into frictional contact with this similar to the fifth embodiment shown in FIG. 12 and has a mechanical characteristic in which the outside ring 32 which is supported so as not to rotate by the usual continuously variable transmission is made rotatable. The driving force transferred to the outside ring 32 is transmitted to the drive shaft 26 via a gear train comprising a flat gear 321 integrally formed with this, a cylindrical flat gear 29, and bevel gears 38 and 39.

Further, the outside ring 32 can slide on the output shaft 12 of the engine 1 and the output shaft 13 of the electric motor 2 in the axial direction by a linear actuator 36. In the figure, 361 denotes the slider which comes into sliding-contact with the outside ring 32 for moving the same in the axial direction. A carrier 33 is attached to the output shaft 12 of the engine 1, and a plurality of sun-and-planet cones 34 are rotatably supported by the carrier 33. The cone portion 341 of the sun-and-planet cone 34 comes into frictional contact with a ring-shaped projection portion 322 formed integrally with the outside ring 22.

Further, the bevel gear portion 342 which is integrally formed with the cone portion 341 on the same axis as the elements constituting the sun-and-planet cone 34 engages with the sun gear 35 in the form of the bevel gear attached to the output shaft 13 of the electric motor 2 located on the same axial line as the output shaft 12 of the engine 1. Note that, the continuously variable transmission 37 is constituted inside the housing 67, and the engine 1 and the electric motor 2 are fixed to the housing 67. Further, although not illustrated in the figure, the output shaft 12 of the engine 1, the output shaft 13 of the electric motor 2 and the drive shaft 26 or drive shaft 27 of the wheel are respectively provided with means for detecting the magnitude of the speed and torque of these shafts and the detection values are input to the ECU 4. The ECU 4 controls the throttle actuator 68, the linear actuator 36 of the continuously variable transmission 37, the inverter 5, etc. based on these signals.

Next, the operation of the seventh embodiment will be explained by FIG. 19. When the output shaft 12 of the engine 1 and the output shaft 13 of the electric motor 2 simultaneously rotate, the sun-and-planet cone 34 rotates due to the difference of the speed between these two shafts 12 and 13. The rotation is converted to the rotation of the outside ring 32 by the frictional engagement of the cone portion 341 and the ring-shaped projection portion 322 provided in the outside ring 32 and taken out from the flat gear 29 engaged with the flat gear 321 of the outside ring 32.

The speed of the outside ring 32 can be smoothly changed by changing the contact position of the cone portion 341 of the sun-and-planet cone 34 and the ring-shaped projection portion 322 by sliding the outside ring 32 in the axial direction by the linear actuator 36 even if the speeds of the output shaft 12 of the engine 1 and the output shaft 13 of the electric motor 2 do not change. Further, as apparent from the mode of operation of the well known continuously variable transmission using a sun-and-planet cone, the continuously variable transmission 37 can smoothly change the speed ratio of the output shaft 12 and the output shaft 13. Accordingly, even if the speed of the output shaft 12 is maintained constant, by smoothly changing the speed of the output shaft 13, the speed of the outside ring 32 can be freely changed. This relationship is true also for the magnitude of the torque transmitted. Therefore, a detailed explanation will be made below of how the control position of the linear actuator 36 in the continuously variable transmission 37, the generated torque Tm and speed Nm of the electric motor 2, and the generated torque Te and speed Ne of the engine 1 are controlled by using this mechanism according to the torque Td and speed Nd of the drive shaft 26 which fluctuate according to the driving of the vehicle.

In order to improve the fuel consumption of the hybrid vehicle and, at the same time, reduce the exhaust emission, the generated torque Te and speed Ne of the engine 1 may be always held at a constant value under optimum conditions. In the normal operating state of a vehicle driven by an engine, however, the driving torque Td and speed Nd continuously greatly fluctuate in accordance with the driving conditions. Therefore, irrespective of the change of the driving torque Td transmitted by the drive shaft 26 and the speed Nd thereof, the ECU 4 controls the position of the outside ring 32 by the linear actuator 36 so that the values of the generated torque Te and speed Ne generated by the engine 1 are maintained substantially constant and, at the same time, controls the generated torque Te and speed Ne of the electric motor 2 by adjusting the supplied electric power from the battery 6 by the inverter 5.

Figure 20:
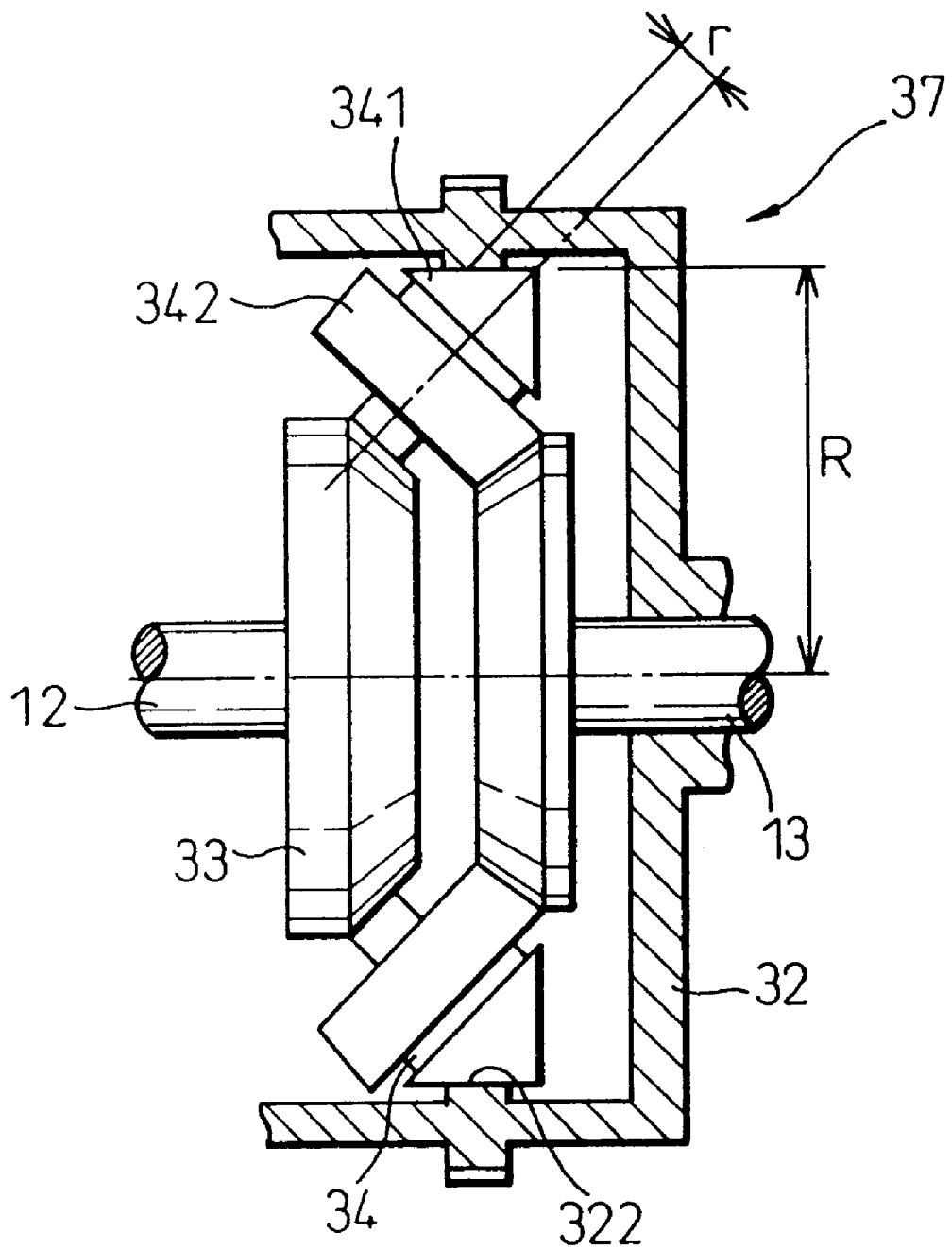
FIG. 20 is a conceptual view further showing only the principal parts of FIG. 19.

As shown in FIG. 20, when the inner diameter (radius) of the ring-shaped projection portion 322 provided in the outside ring 32 is R and the effective radius of the cone portion 341 at the contact point with the ring-shaped projection portion 322 is r, the generated torque TE and speed NE of the engine can be respectively represented as follows by the relationship of the sun-and-planet gear:

$$TE = A \cdot Td\{1+(R-2r)/R\} \quad (2)$$

Alternatively, this can be rewritten as follows:

$$TE/Td = A\{1+(R-2r)/R\} \quad (2)$$

Further, $$NE = B\{Nm(R-2r)+R \cdot Nd\}/2(R-r) \quad (3)$$

Here, A and B are constants determined according to the deceleration ratio of the gear, the diameter of the cone portion, etc.

In the illustrated seventh embodiment, the drive shaft torque transmitted to the drive shaft 26, while fluctuating in accordance with the driving state, will be distributed to the output shaft of the engine and the output shaft of the electric motor by using the continuously variable transmission 37 as the "distributor" while constantly changing the distribution ratio. Equation 2 is for determining the relationship between the torque TE of the engine and the torque Te of the electric motor, that is, with what ratio the drive shaft torque fluctuating in accordance with the driving state is distributed to the two. Equation 3 is used for calculating the electric motor speed Nm since it shows the relationship of the electric motor speed Nm and the drive shaft speed Nd with respect to the speed NE of the engine.

The magnitude of the drive shaft torque Td greatly changes in accordance with the state of driving, therefore the ECU 4 determines the value of the effective radius r of the cone portion 341 of the sun-and-planet cone 34 in the continuously variable transmission 37 according to Equation 2 so that the generated torque TE of the engine becomes a predetermined constant value and controls the linear actuator 36 so that r becomes that value.

Next, the electric motor speed Nm is determined by using Equation 3 so that the engine speed NE becomes the predetermined constant value. Note that, the generated torque Tm of the electric motor 2 becomes the difference between the drive shaft torque Td and the generated torque TE of the engine 1, therefore if the torque TE becomes larger than the torque Tm, the torque Tm becomes a negative value and the electric motor 2 operates as a power generator and will charge the battery 6.

As described above, by changing the operating position of the linear actuator 36 of the continuously variable transmission 37 by the operation of the ECU 4, that is, the position of the ring-shaped projection portion 322 of the outside ring 32 in the axial direction, the speed ratio of the output shaft 12 of the engine 1 and the output shaft 13 of the electric motor 2 is changed and, at the same time, by changing the speed Nm of the electric motor 2 by a means such as the inverter 5, it becomes possible to freely operate the vehicle while constantly holding the generated torque and the speed of the engine 1 at constant values under the optimum conditions, therefore the exhaust emission can be sufficiently reduced.

An explanation will be made next of another embodiment of the present invention. In the seventh embodiment, the engine 1 was provided with a throttle actuator 68 like for example a gasoline engine, but the engine in the present invention does not have to be provided with a throttle actuator 68. Therefore, the engine can be for example a diesel engine too. If the engine 1 in FIG. 18 is a diesel engine, the block 68 in the figure will correspond to the fuel injection pump. Further, it is also possible to use a specific type of gasoline engine, for example a lean burn engine, Atkinson cycle engine, or reduced cylinder engine and, in certain cases, use a Stirling cycle engine and steam engine, etc. as the engine 1, therefore they can be referred to overall as heat engines.

We claim:

1. A hybrid vehicle comprising:

a heat engine which generates a driving force by heat energy, an electric motor which (a) can turn a rotor by passing a current through a coil wound in an internal portion, and (b) can generate electric power by turning of said rotor by an external torque, and a drive shaft which transmits the torque necessary for driving the vehicle to wheels of the vehicle and which is provided with a torque distributor which distributes the torque to be transmitted by said drive shaft to an output shaft of said heat engine and an output shaft of said electric motor and which can change the ratio of the torque distribution between said drive shaft and the output shaft of said heat engine and the output shaft of said electric motor.

2. A hybrid vehicle according to claim 1, further comprising:

control means for performing control so that the torque of the output shaft of said heat engine always becomes a predetermined constant value by changing the ratio of the torque distribution between the output shaft of said heat engine and the output shaft of said electric motor by said torque distributor.

3. A hybrid vehicle according to claim 1, further comprising control means for controlling the speed of the output shaft of said electric motor so that the speed of the output shaft of said heat engine always becomes a predetermined constant value.

4. A hybrid vehicle according to claim 1, wherein said torque distributor comprises:

a continuously variable transmission comprising a sun gear, a sun-and-planet cone comprised by a cone portion integrally formed with a sun-and-planet gear portion engaged with said sun gear, a carrier which is arranged on the same axis as said sun gear and which rotatably supports said sun-and-planet cone, and a ring which is in contact with said cone portion of said sun-and-planet cone and which is rotatably supported on the same axis as said sun gear and said carrier and which can freely slide in said axial line direction, the contact position of which with said cone portion of said sun-and-planet cone being made variable; said ring is connected to said drive shaft and to said sun gear and said carrier are connected to the output shaft of said electric motor and the output shaft of said heat engine, respectively; and by changing the sliding position of said ring, the ratio of distribution of the torque transmitted to said drive shaft to the output shaft of said heat engine and the output shaft of said electric motor can be changed.

5. A hybrid vehicle according to claim 2, wherein said torque distributor comprises a continuously variable transmission comprising a sun gear, a sun-and-planet cone comprised by a cone portion integrally formed with a sun-and-planet gear portion engaged with said sun gear, a carrier which is arranged on the same axis as said sun gear and rotatably supports said sun-and-planet cone, and a ring which is in contact with said cone portion of said sun-and-planet cone and, at the same time, is rotatably supported on the same axis as said sun gear and said carrier and can freely slide in said axial line direction, the contact position of which with said cone portion of said sun-and-planet cone being made variable; said ring is connected to said drive shaft and, at the same time, said sun gear and said carrier are connected to the output shaft of said electric motor and the output shaft of said heat engine, respectively; and by changing the sliding position of said ring, the ratio of distribution of the torque transmitted to said drive shaft to the output shaft of said heat engine and the output shaft of said electric motor can be changed.

6. A hybrid vehicle according to claim 3, wherein said torque distributor comprises a continuously variable transmission comprising a sun gear, a sun-and-planet cone comprised by a cone portion integrally formed with a sun-and-planet gear portion engaged with said sun gear, a carrier which is arranged on the same axis as said sun gear and rotatably supports said sum-and-planet cone, and a ring which is in contact with said cone portion of said sun-and-planet cone and, at the same time, is rotatably supported on the same axis as said sun gear and said carrier and can freely slide in said axial line direction, the contact position of which with said cone portion of said sun-and-planet cone being made variable; said ring is connected to said drive shaft and, at the same time, said sun gear and said carrier are connected to the output shaft of said electric motor and the output shaft of said heat engine, respectively; and by changing the sliding position of said ring, the ratio of distribution of the torque transmitted to said drive shaft to the output shaft of said heat engine and the output shaft of said electric motor can be changed.

7. A hybrid vehicle provided with two power sources comprising a heat engine and electric motor, a continuously variable transmission as a transmission means of said heat engine, and an electronic control unit for controlling the outputs of said heat engine and said electric motor and the transmission ratio of said continuously variable transmission, wherein said continuously variable transmission is constituted so as to maintain the speed of said heat engine constant when controlled in its transmission ratio with respect to a fluctuating vehicle speed, and said electric motor is constituted so as to maintain the torque of said heat engine constant when controlled in its torque with respect to a fluctuating driving force.

8. A hybrid vehicle according to claim 7 constituted in that, at the start, the engine is started by only the output of said electric motor; a clutch inserted between the output shaft of said heat engine and the driving wheel is engaged when the speed of the input shaft of said continuously variable transmission and the predetermined idling speed of said heat engine coincide; and in the acceleration after this, the speed of said heat engine is smoothly increased up to the normal speed of said heat engine and, after it reaches the normal speed, the transmission ratio of said continuously variable transmission is controlled.

9. A hybrid vehicle according to claim 7, wherein the input shaft of said continuously variable transmission is connected to the output shaft of said heat engine; the input shaft of said electric motor is connected to the output shaft of said continuously variable transmission; and the driving wheels are connected to the output shaft of said electric motor.

10. A hybrid vehicle according to claim 8, wherein the input shaft of said continuously variable transmission is connected to the output shaft of said heat engine; the input shaft of said electric motor is connected to the output shaft of said continuously variable transmission; and the driving wheels are connected to the output shaft of said electric motor.

11. A hybrid vehicle according to claim 7, wherein the input shaft of said continuously variable transmission is connected to the output shaft of said heat engine; and the output shaft of said electric motor and the driving wheels are connected to the output shaft of said continuously variable transmission.

12. A hybrid vehicle according to claim 8, wherein the input shaft of said continuously variable transmission is connected to the output shaft of said heat engine; and the output shaft of said electric motor and the driving wheels are connected to the output shaft of said continuously variable transmission.

13. A hybrid vehicle according to claim 7, wherein the input shaft of said electric motor is connected to the output shaft of said heat engine; the input shaft of said continuously variable transmission is connected to the output shaft of said electric motor; and the driving wheels are connected to the output shaft of said continuously variable transmission.

14. A hybrid vehicle according to claim 8, wherein the input shaft of said electric motor is connected to the output shaft of said heat engine; the input shaft of said continuously variable transmission is connected to the output shaft of said electric motor; and the driving wheels are connected to the output shaft of said continuously variable transmission.

15. A hybrid vehicle according to claim 7, wherein the input shaft of said continuously variable transmission is connected to the output shaft of said heat engine and the output shaft of said electric motor; and the driving wheels are connected to the output shaft of said continuously variable transmission.

16. A hybrid vehicle according to claim 8, wherein the input shaft of said continuously variable transmission is connected to the output shaft of said heat engine and the output shaft of said electric motor; and the driving wheels are connected to the output shaft of said continuously variable transmission.

17. A hybrid vehicle having a heat engine for converting heat energy to a driving force and an electric motor for converting electric energy to a driving force, disposing said electric motor at a position midway of the drive shaft for connecting the output shaft of said heat engine and the driving wheel of the vehicle, and driving the driving wheels by using said heat engine and said electric motor, wherein a transmission which automatically changes the transmission ratio in accordance with the speed of the output shaft of said electric motor is provided between the output shaft of said heat engine and the output shaft of said electric motor and is controlled so that the speed of the output shaft of said heat engine becomes constant by the transmission.

18. A hybrid vehicle according to claim 17, wherein provision is made of a control means which makes the output torque of said heat engine constant and generates a torque of an amount corresponding to a difference between the torque of said transmission on the electric motor side changing according to the transmission ratio of said transmission and the driving torque of said drive shaft connected to said driving wheel by said electric motor.

19. A hybrid vehicle according to claim 17, wherein the transmission ratio of said transmission is automatically controlled in accordance with the centrifugal force generated by the rotation of the output shaft of the transmission.

20. A hybrid vehicle according to claim 18, wherein the transmission ratio of said transmission is automatically controlled in accordance with the centrifugal force generated by the rotation of the output shaft of the transmission.

21. A hybrid vehicle according to claim 19, wherein said transmission comprises a continuously variable transmission using a slide ring and a sun-and-planet cone; and a mechanism for sliding the slide ring for transmission on the sun-and-planet cone in accordance with the centrifugal force generated around the output shaft of the transmission is added.

22. A hybrid vehicle according to claim 20, wherein said transmission comprises a continuously variable transmission using a slide ring and a sun-and-planet cone; and a mechanism for sliding the slide ring for transmission on the sun-and-planet cone in accordance with the centrifugal force generated around the output shaft of the transmission is added.

23. A hybrid vehicle according to claim 19, wherein said transmission comprises a transmission provided with variable pitch pulleys on the input shaft and the output shaft and a belt wound and hung between the variable pitch pulleys; and a mechanism which changes the pitch of the pulleys in accordance with the centrifugal force generated around the output shaft of the transmission is added.

24. A hybrid vehicle according to claim 20, wherein said transmission comprises a transmission provided with variable pitch pulleys on the input shaft and the output shaft and a belt wound and hung between the variable pitch pulleys; and a mechanism which changes the pitch of the pulleys in accordance with the centrifugal force generated around the output shaft of the transmission is added.

* * * * *